April 6, 1943.  R. D. JUNKINS ET AL  2,315,527
CONTROL SYSTEM
Filed Sept. 30, 1938   14 Sheets-Sheet 1

Inventors
RAYMOND D. JUNKINS,
JOHN D. RYDER, AND
JOHN F. LUHRS
By Raymond D. Junkins.
Attorney April 6, 1943.　　　　R. D. JUNKINS ET AL　　　　2,315,527
CONTROL SYSTEM
Filed Sept. 30, 1938　　　　14 Sheets-Sheet 2

Inventors
RAYMOND D. JUNKINS,
JOHN D. RYDER, AND
JOHN F. LUHRS
Raymond D. Junkins
Attorney

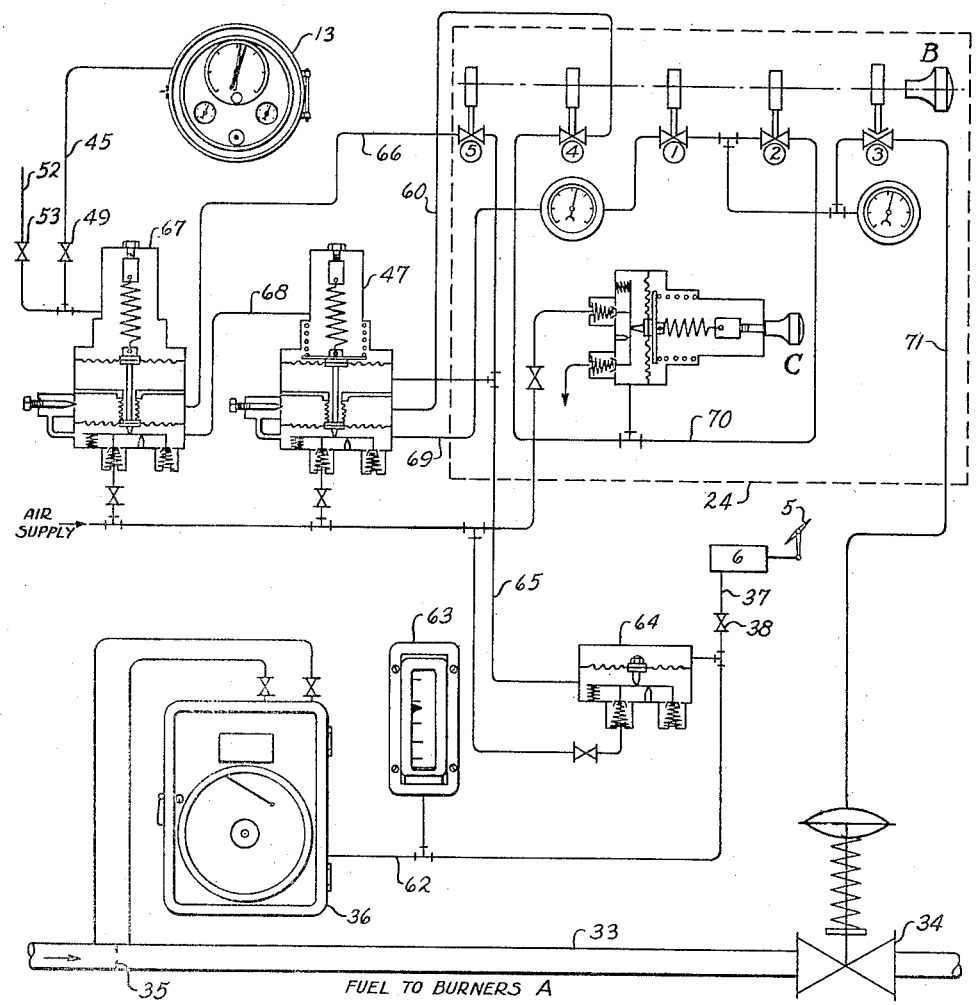

Fig. 5

| TRANSFER KNOB POSITION | VALVE ① | VALVE ② | VALVE ③ | VALVE ④ | VALVE ⑤ | RELAY ACTION |
|---|---|---|---|---|---|---|
| MANUAL | CLOSED | OPEN | OPEN | OPEN | OPEN | TURN KNOB "C" TO ESTABLISH DESIRED CONTROL PRESSURE |
| RESET - MANUAL TO AUTOMATIC | OPEN | CLOSED | CLOSED | OPEN | OPEN | IN TRANSFERING FROM HAND TO AUTOMATIC TURN KNOB "B" IMMEDIATELY FROM HAND TO AUTOMATIC POSITIONS |
| AUTOMATIC | OPEN | CLOSED | OPEN | CLOSED | CLOSED | LOADING PRESSURE IS TRANSMITTED DIRECTLY TO CONTROL VALVE |
| RESET - AUTOMATIC TO MANUAL | CLOSED | OPEN | CLOSED | CLOSED | CLOSED | TURN KNOB "C" TO SPRING LOAD RELAY TO ESTABLISH CONTROL PRESSURE EQUAL TO CONTROL PRESSURE BEFORE TRANSFER |

Inventors
RAYMOND D. JUNKINS,
JOHN D. RYDER, AND
JOHN F. LUHRS
By Raymond D. Junkins
Attorney April 6, 1943.  R. D. JUNKINS ET AL  2,315,527
CONTROL SYSTEM
Filed Sept. 30, 1938  14 Sheets-Sheet 6

Inventors
RAYMOND D. JUNKINS,
JOHN D. RYDER, AND
JOHN F. LUHRS
By Raymond D. Junkins
Attorney

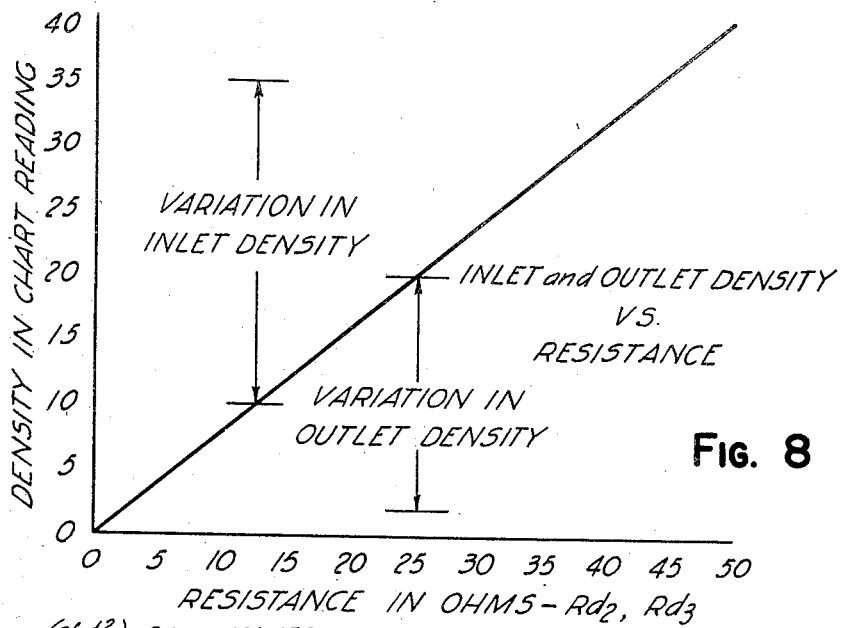
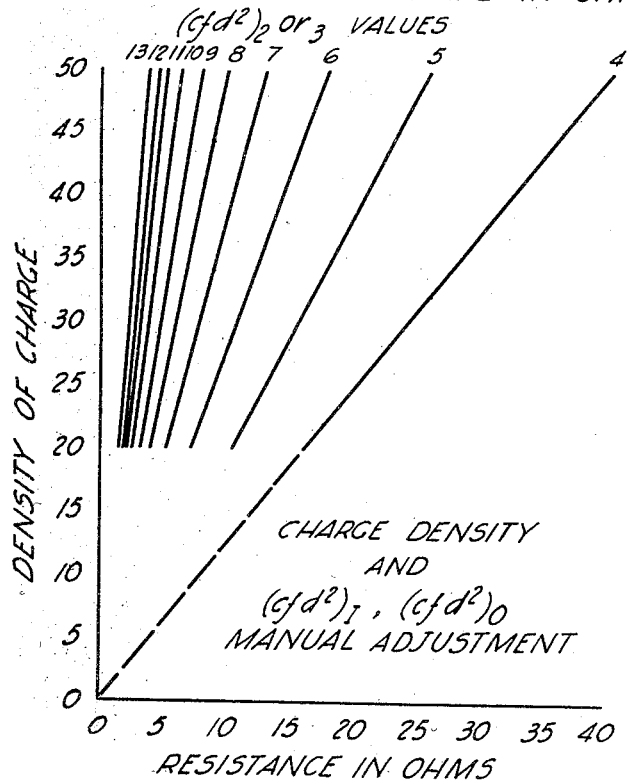

April 6, 1943.   R. D. JUNKINS ET AL   2,315,527
CONTROL SYSTEM
Filed Sept. 30, 1938   14 Sheets-Sheet 8

Inventors
RAYMOND D. JUNKINS,
JOHN D. RYDER, AND
JOHN F. LUHRS
By Raymond D. Junkins
Attorney April 6, 1943.  R. D. JUNKINS ET AL  2,315,527
CONTROL SYSTEM
Filed Sept. 30, 1938  14 Sheets-Sheet 9

Inventors
RAYMOND D. JUNKINS,
JOHN D. RYDER, AND
JOHN F. LUHRS
By Raymond D. Junkins
Attorney April 6, 1943.    R. D. JUNKINS ET AL    2,315,527
CONTROL SYSTEM
Filed Sept. 30, 1938    14 Sheets-Sheet 10

Inventors
RAYMOND D. JUNKINS,
JOHN D. RYDER, AND
JOHN F. LUHRS
By Raymond W. Junkins
Attorney April 6, 1943.  R. D. JUNKINS ET AL  2,315,527
CONTROL SYSTEM
Filed Sept. 30, 1938  14 Sheets-Sheet 14

Inventors
RAYMOND D. JUNKINS,
JOHN D. RYDER, AND
JOHN F. LUHRS
By Raymond D. Junkins Attorney Patented Apr. 6, 1943

2,315,527

UNITED STATES PATENT OFFICE 2,315,527

CONTROL SYSTEM

Raymond D. Junkins, Cleveland Heights, John D. Ryder, University Heights, and John F. Luhrs, Cleveland Heights, Ohio, assignors to Bailey Meter Company, a corporation of Delaware Application September 30, 1938, Serial No. 232,644

14 Claims. (Cl. 122—448)

This invention relates to the art of measuring and/or controlling the magnitude of variable quantities, conditions, relations, etc., and particularly such a variable condition as the density of a liquid-vapor mixture, although the variable may be temperature, pressure, or any physical, chemical, electrical, hydraulic, thermal, or other characteristic.

Our invention is particularly directed to a variable condition such as, for example, the density of a flowing fluid undergoing treatment. The variation in the flowing fluid undergoing treatment may be epitomized as a "condition" change and for the purpose of this application it will be understood that a condition change may be either a physical or chemical change, or both, and that the method hereinafter outlined and the apparatus specified is designed to be effective for all such conditions.

"Condition change" refers to a change in the character or quality or condition of a fluid as distinguished from a quantity change, such as rate of flow, or change in a position as, for instance, movement of the fluid from one tank to another. Moreover, whenever herein the word "treating" or "treatment" is used it is to be understood that any acting upon or in connection with a fluid is intended; a fluid is treated when it is heated, when it undergoes chemical change, when two or more varying-characteristic fluids are brought together, when a fluid is electrolized, or when its degree of ionization is changed as, for instance, by dilution, change of temperature, etc., and in general when anything is done in connection with a fluid which is qualitative as distinguished from quantitative.

These terms "qualitative" and "quantitative" have reference to the broadest meaning thereof when used in connection with a definition of what is meant by "condition change"; for instance the addition to or subtraction of heat from a fluid may merely cause it to expand or contract in size per unit of weight, but this change is nevertheless considered as qualitative rather than quantitative. Similarly passage of electric current from one electrode to another immersed in a fluid is considered to effect a qualitative change therein within this disclosure; in short, any phenomenon in a flowing fluid which so evidences itself as to be measured in the manner herein disclosed or in connection with a density determination is deemed to be a "condition change."

Having the foregoing in mind it will be seen that condition changes may occur as the result of several different operations sequentially or simultaneously. For instance considering the change in density which occurs in a flowing fluid, such change may be the result of the heating of the fluid, or of an alteration in the chemical composition of the fluid without heat being imparted thereto, or of an expansion of the fluid while flowing through a treating zone, for instance by changing the volume per unit lineal distance of the space in which the fluid is traveling, or a combination of these effects may cause changes in the density of a flowing fluid with consequent production of a variable which may be used as a basis for fluid processing control. It should not, of course, be overlooked that similar differing conditions may also result in variations in temperature, pressure, and the other factors which vary in a process. Moreover, a temperature change may occur in a fluid entirely because of internal action and without any external subtraction or addition of heat, that is as a result of chemical action.

In the present invention the method and apparatus disclosed and described are useful not only in the determination of density of the flowing fluid at different points of its flow path, but also in the determination of mean density, time of treatment, yield per pass, and other variables or conditions which may or may not depend upon the value of density or changes in such value. Furthermore, having provided the requisite apparatus for continuously determining such variables we utilize manifestations thereof in the control of the same or other fluid treatment or processing.

We have chosen to illustrate and describe as a preferred embodiment of our invention its adaptation to the measuring and controlling of the density and other characteristics of a flowing heated fluid stream, such as the flow of hydrocarbon oil through a cracking still. It will be understood however that the invention is equally as well adapted to the measuring and controlling of variables in the processing of other fluids and in connection with their treatment or processing, whether chemical or physical, or both, in nature.

The heated once through path of a forced flow vapor generator, such as a steam boiler, is quite comparable to the forced flow path of hydrocarbon oil through a tube still, or cracking unit, and the invention which we illustrate and describe, preferably in connection with the treatment of hydrocarbon oil, is to be considered as not restricted thereto but as applicable to the generation of steam or the processing of any or all fluids.

In connection with the preferred embodiment of our invention, namely, in the treatment or processing or hydrocarbon oil, our invention is particularly directed and useful with divided furnace or double furnace operation. By this we mean that the charge fluid, whatever be its nature, is supplied to a forced flow confined path under pressure and that such path may comprise one or more parallel long small bore tube passages. Preferably the path (and the fluid therein) is heated by the external application thereto of heat produced by the combustion of any desired fuel. Of course the heating may be accomplished by other means, such as heat transfer from another fluid or by waste heat gases, etc. Therefore, when we speak in the claims of "heating" we are not to be limited as to the form or type of heating apparatus which is disclosed and described by way of illustration in the present description and drawings.

Preferably the forced flow fluid path is divided into two portions which may or may not be of equal length and volume. Preferably the two portions are subjected each to a degree or amount of heating, or rate thereof, dependent entirely upon the desired treatment or processing to be accomplished in that portion of the path and controlled individually as to the particular portion of the path and such control in accordance with characteristics of the fluid within or leaving the path. For example, the oil to be treated or processed will enter the path under pressure (charge), going first into a sensible heat absorbing portion or section of the path, and then passing into a conversion section wherein cracking may desirably take place.

We desirably control the heating to the sensible heat absorbing section separately and individually from the heating which is applied to the conversion section. Furthermore, we determine in connection with each of the sections those variables, such as density, mean density, time of detention, yield per pass, etc., which are of extreme interest and importance in controlling the heating of such sections to accomplish optimum results in the treating or processing.

It will be appreciated that the two portions mentioned of the fluid flow path with separate control of the heating may be housed in a single furnace structure, or may be housed in separate furnace structures, preferably closely adjacent. The present preferred embodiment is illustrated and described as having a sensible heat absorbing section and a conversion section housed in a single furnace unit with a bridge wall dividing the sections of the furnace. It will, of course, be appreciated that many modifications or variations may come within the scope of our contemplation, and that it is only necessary for us to illustrate and describe, by way of illustration, a preferred arrangement and embodiment of our invention.

While a partially satisfactory control of the cracking operation may be had from a knowledge of the temperature, pressure, and rate of flow of the fluid stream being treated, yet a knowledge of the density, or manifestations thereof or related thereto, of the flow stream at different points in its path is of a considerably greater value to the operator. Furthermore, as a basis for automatic control of the processing these variables or manifestations thereof provide highly satisfactory motivating means. The present invention is somewhat related to Patents 2,217,634; 2,217,637, 2,217,638 and 2,217,639 to which reference may be had.

In the treatment of water below the critical pressure, as in a vapor generator, a knowledge of pressure, temperature and rate of flow may be sufficient for proper control inasmuch as definite tables have been established for interrelation between temperature and pressure, and from which tables the density of the liquid or vapor may be determined. However, there are no available tables for mixtures of liquid and vapor.

In the processing of a fluid, such as a petroleum hydrocarbon, a change in density of the fluid may occur through at least three causes:

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the in situ density of the fluid or of a mixture of the liquid and vapor that the operator may have any reliable knowledge as to the physical condition of the fluid stream at various points in its treatment or when subject to a condition change. In the past any attempt which has been made to determine such conditions have resulted in "history" rather than "news" due to the fact that they were based on the withdrawing of samples for laboratory analysis. Such samples withdrawn from a flow path of necessity had to be brought down to substantially atmospheric conditions of pressure and temperature, and at such conditions the in situ or flowing fluid relationship of liquids, gases, and vapors was by no means the same as under flowing conditions. For example, the vapors and gases would condense or become dissolved or would pass away. Furthermore, any analysis or test of the sample could only be accomplished after laborious and lengthy laboratory procedure, which meant that the result was obtained minutes or hours after the sample had been withdrawn.

In contradistinction to such antiquated and unsatisfactory sampling and testing the present invention continuously and accurately determines the in situ density or other characteristic, and by this we mean that such characteristic or condition is determined while the fluid is in motion, while it is being treated, and under actual operating conditions of temperature and/or pressure. Thus a continuous and immediate manifestation of the variable or condition is available, either by visual indication or as a position or force which may be incorporated in an automatic control system.

It will be readily apparent to those skilled in the art that the continuous determination of the density of such a flowing stream is of tremendous importance and value to an operator in controlling the heating, mean density, time of detention and/or treatment, as well as the yield per pass in a given portion of the circuit, etc. A continuous knowledge of the density of such a heated flowing stream is particularly advantageous where wide changes in density occur due to formation, generation, and/or liberation of gases with a resulting formation of liquid-vapor mixtures, velocity changes, and varying time of detention in different portions of the fluid path. In fact, for a fixed or given volume of path, a determination of the mean density in that portion provides the only possibility of accurately determining the time that the fluid in that portion of the path is subjected to heating or treatment. By our invention we provide the requisite system and apparatus wherein a determination of such information comprises the guiding means for automatic control of the process or treatment.

While illustrating and describing our invention as preferably adapted to the cracking of petroleum hydrocarbons, it is to be understood that it may be equally adaptable to the vaporization or treatment of other liquids and in other processes. For example, in the distillation of oils, the generation of steam, and other chemical and/or physical processes, wherein a fluid is subjected to a condition change, as for example the heating of a fluid flow path. In particular, the invention relates to the automatic control of the treatment process, and as a specific example thereof we have illustrated and will describe the control of the rate of flow and of the heating in a cracking still.

Figure 2:
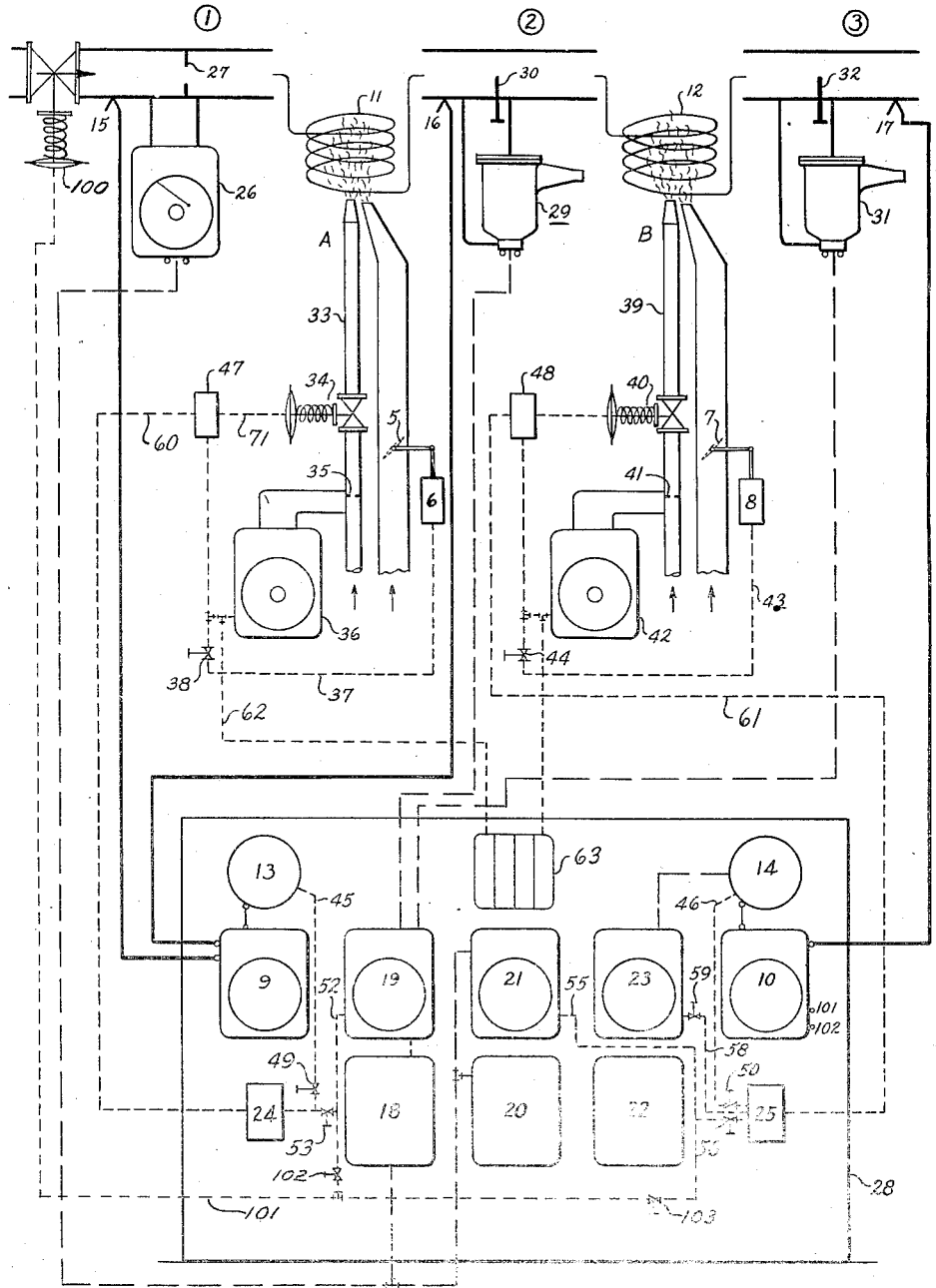
Fig. 2 is a diagrammatic representation of measuring and controlling apparatus for a heated fluid stream.
Figure 3:
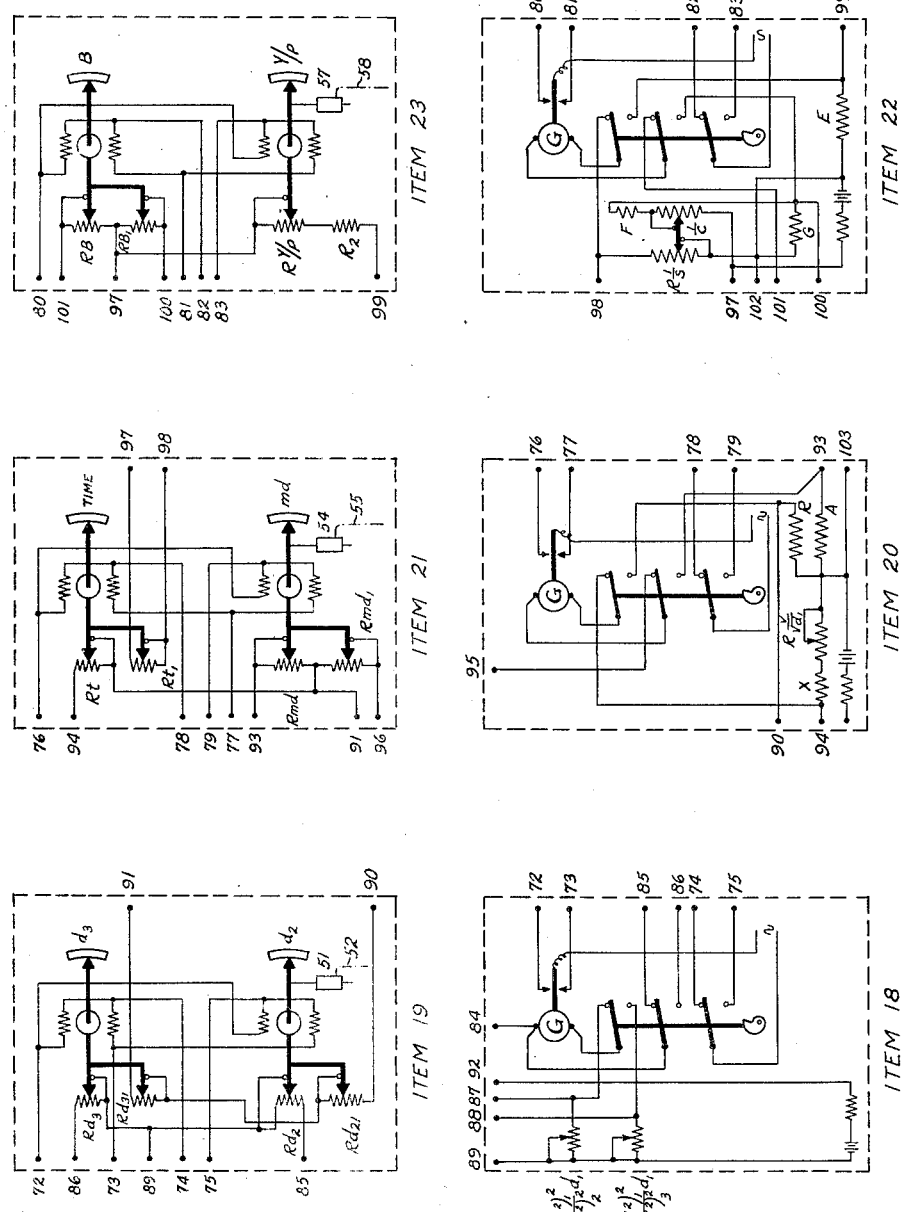

Fig. 3 diagrammatically illustrates the internal arrangement of apparatus and wiring within certain of the instrumentalities of Fig. 2.

Figure 4:
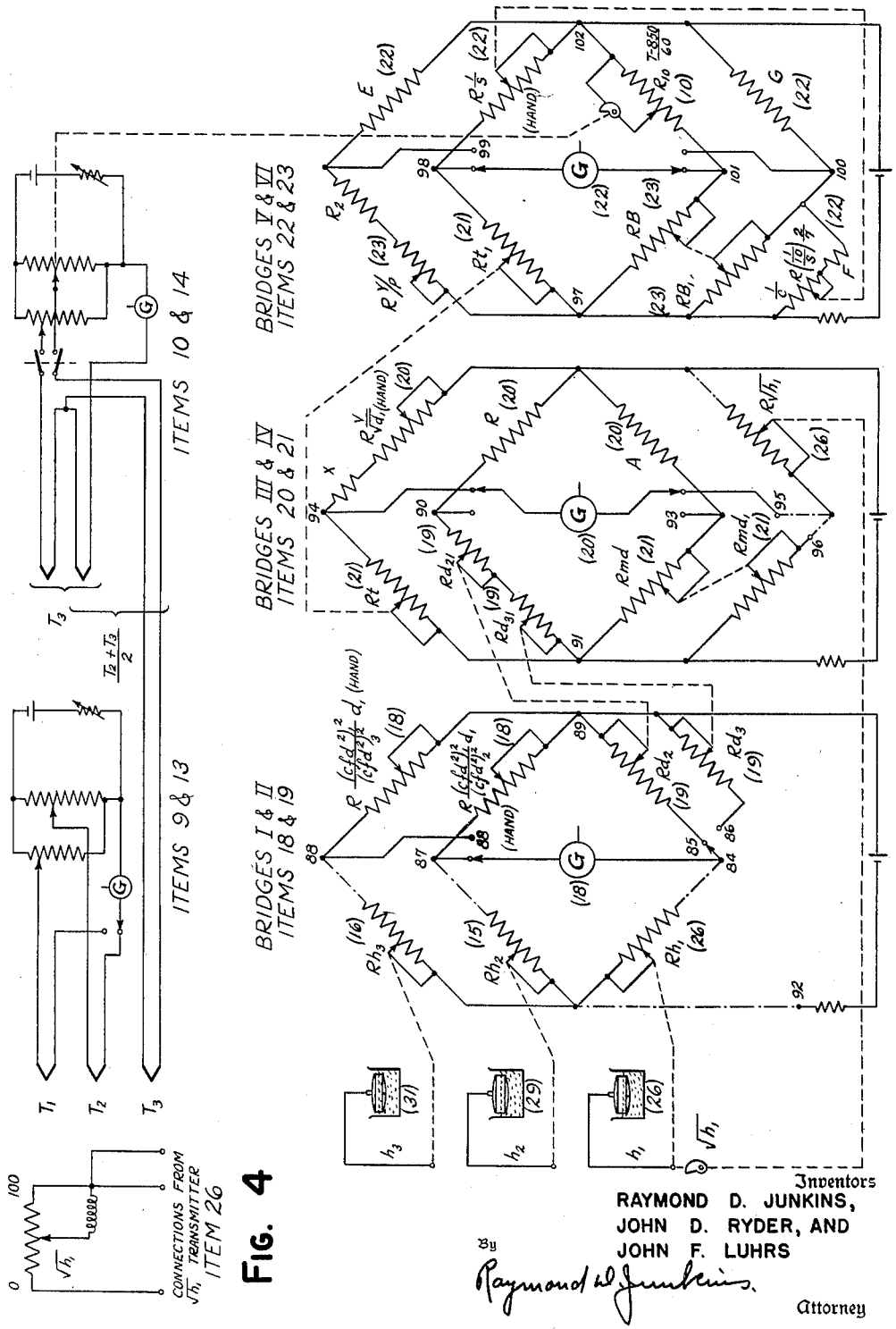

Fig. 4 is a functional wiring diagram of the system.

Fig. 5 is a diagrammatic arrangement of certain of the fluid pressure control apparatus incorporated in the preferred embodiment.

Figure 6:
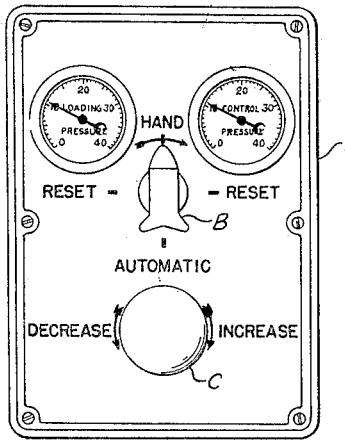

Fig. 6 illustrates a selector valve for the fluid pressure control system.

Figs. 7–22, inclusive, are curves or graphs of relationships in connection with the invention, and particularly in reference to Figs. 3 and 4.

Figure 1:
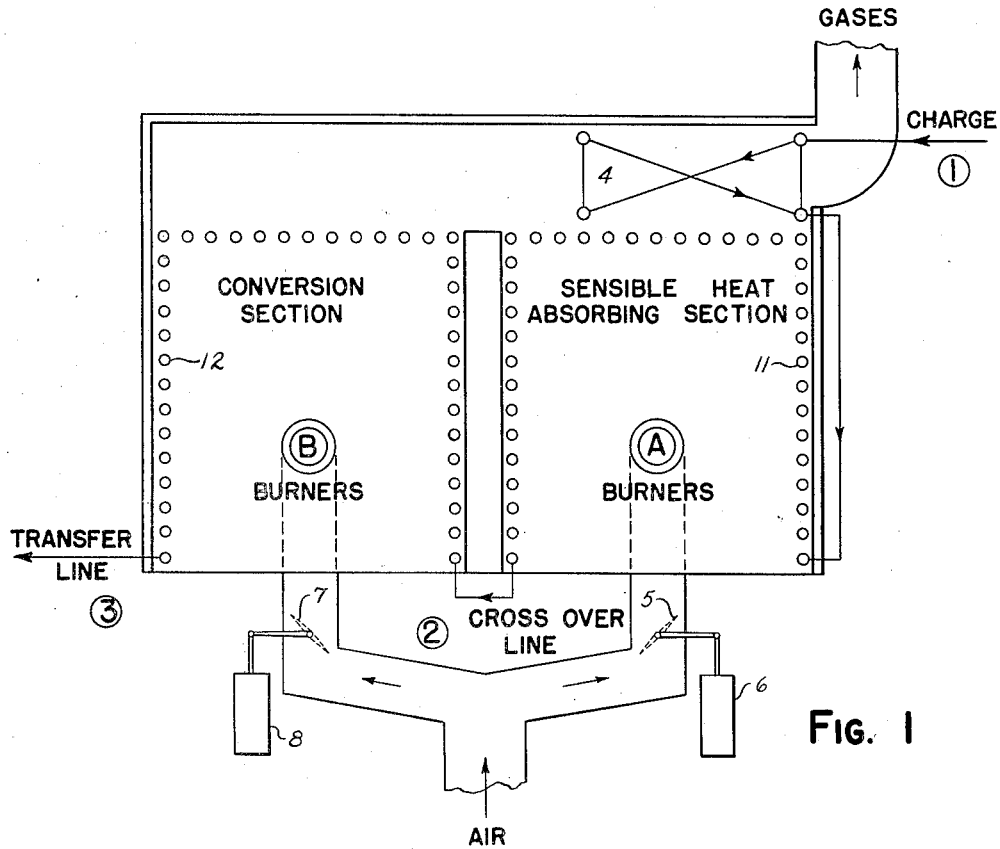
Fig. 1 is a diagrammatic sectional elevation of a divided furnace structure to which the invention has been applied.

Referring now in particular to Fig. 1, we indicate therein in diagrammatic sectional elevation a furnace assembly comprising two separately heated sections discharging products of combustion to a common stack. We have indicated that a bridge wall substantially divides the furnace structure into two separate rooms or compartments, but that the bridge wall does not extend to the roof whereby the gaseous products of combustion from one of the sections passes over the top of the bridge wall joining the gaseous products of combustion from the other section, and the two streams or total gases then pass through a preheating section on the way to the stack.

We have illustrated diagrammatically that the walls and roof of each of the sections of the furnace are substantially lined with tubes and the tubes are in well known manner connected to form a continuous flow path for the fluid.

We indicate the "charge" or incoming hydrocarbon as entering at a location 1, passing through a preheating section 4, a sensible heat absorbing section or portion of the path, the cross-over line 2, the conversion section or portion of the path, and leaving the furnace structure by the transfer line 3. The once through fluid path of the still may comprise one or more parallel tube paths but in Fig. 1 and elsewhere in the present disclosure we consider merely a single tube path for purpose of simplicity.

In Fig. 1 we illustrate the sensible heat absorbing section of the furnace structure as being subjected to the heat of one or more burners A while the conversion section of the furnace and corresponding portion of the fluid flow path is subjected to the heating of one or more burners B. The burners A and B are supplied with the necessary air for combustion from any source which may be a forced draft blower, and indicated diagrammatically in Fig. 1 as having a common supply duct divided to the burners A and B. The air going to the burners A is controlled by a damper 5 positioned by a pneumatic actuator 6, while the air going to the burners B is under the control of a damper 7 positioned by a pneumatic actuator 8.

It will be appreciated that the sensible heat absorbing section and/or the conversion section of the furnace construction may be subjected to heat of combustion or to waste heat, or otherwise. As described herein, the burner or burners A and the burner or burners B are adapted to supply a fluid fuel, such as gas, oil, or pulverized coal. It is not necessary to show any detailed structure as to the type of burners or the specific arrangement of supplying air to the burners. We indicate and will refer to the fuel supply as A to the sensible heat absorbing section and B to the conversion section.

In Fig. 1, and elsewhere, the fluid flow path has three principal locations of interest in describing our invention. We indicate location 1 at the point of the charge entering the system. The location 2 at the cross-over line between the sensible heat absorbing portion of the fluid flow path and the conversion portion of the fluid flow path. We indicate at 3 the discharge from the conversion section to the transfer line. Hereinafter reference will be made to "locations 1, 2 or 3."

With such an arrangement as is indicated in Fig. 1 the fluid will undergo a condition change and, during such condition change, the density of the fluid will change so that the density at location 2 will be different from the density at location 1, and the density at location 3 will preferably be different than at 1 or 2. In the sensible heat absorbing section there may be very little or no cracking or polymerization take place. Preferably the cracking will take place in the conversion section. In said section the condition change brought about by the application of heat through the burners B may be a physical change, or a chemical change, or a combination of both.

In Fig. 2 we have diagrammatically illustrated the flow circuit of Fig. 1, and in addition have diagrammatically represented the metering and controlling apparatus preferably applied. The forced flow path is represented as a single tube wherein the charge or relatively untreated hydrocarbon passes the location 1, through the sensible heat absorbing portion of the path 11, passes location 2, through the conversion portion of the path 12, and joins the transfer line after passing location 3. Temperatures at locations 1, 2, 3 are determined by thermocouples 15, 16, 17 respectively. The rate of flow of the charge or relatively untreated hydrocarbon is continuously measured by the rate of flow meter 26. This is a differential responsive device connected across an orifice 27 of fixed opening, and across which there exists a differential pressure varying in known relation to rate of flow of fluid therethrough. The meter 26 is arranged to record the rate of flow of the charge fluid directly upon a uniformly graduated chart and is the dictating means, adapted to position resistances, for remotely telemetering representations of differential head and of rate of flow to a central panel board 28 containing measuring and controlling apparatus to be described in detail hereinafter.

At location 2 a differential pressure responsive device 29 is connected to be responsive to the differential pressure existing across an adjustable orifice 30, which latter is adapted to be positionable across the flow path to vary the amount of restriction, and thereby vary the differential head produced for a given rate of flow. At location 3 a similar differential pressure responsive device 31 is connected to be responsive to differential head produced by an adjustable orifice 32. The responsive devices 29, 31 are not recording at their transmitting locations, that is adjacent the orifices 30, 32. Each of the devices 29, 31 however comprises a transmitter for telemetering to the panel board 28 a representation of the value of differential head existing at location 2 and at location 3.

While the fluid flow measuring instrumentalities 26, 29 and 31 are illustrated and described as differential pressure responsive devices, it will be understood that such showing and description are illustrative only and not to be taken in a limiting sense, because fluid flow measuring devices, such as displacement meters, volumetric meters, Thomas meters, or the like, may be used in the determination of fluid density in practicing the invention herein disclosed.

In Fig. 2 we illustrate the fuel supply line 33 leading to the burners A and having therein a pneumatic regulating valve 34, as well as a measuring orifice 35 across which is connected a rate of flow meter 36 adapted to continuously record the rate of supply of fuel to the burners A and to initiate a constant flow control effective upon the valve 34. At the same time the constant flow controller 36 is connected pneumatically through the pipe 37 to the actuator 6. Thus the controller 36 and the actuator 6 comprise a fuel-air ratio control, wherein the supply of air for combustion to the burners A is always controlled proportionate to the actual rate of supply of fuel through the conduit 33. A valve 38 is provided so that the actuator 6 may be disconnected and the damper 5 may be positioned by hand if desired.

In like manner fuel is supplied to the burners B through a conduit 39 under the regulation of a valve 40 and measured by a recorder-controller 42 connected across an orifice 41. The controller 42 provides a constant flow control regulating the valve 40 and a fuel-air ratio control effective through the pipe 43 upon the air damper actuator 8.

The control panel 28 is preferably remotely located relative to the furnace and the transmitters 26, 29, 31. On the panel 28 are shown various instrumentalities which will be described more in detail hereinafter. The thermocouples 15, 16 are wired to a temperature recorder 9 while the thermocouple 17 is wired to a temperature recorder 10. Associated with the instrumentalities 9, 10 are controllers 13, 14 actuated in accordance with certain temperatures and setting up air loading pressures effective through the pipes 45, 46 respectively. The devices indicated at 18—23, inclusive, comprise the receivers of the telemetering systems, for which 26, 29, 31 are the transmitters. We have illustrated in Fig. 2 by long dash lines the electrical cables connecting the transmitters 26, 29 and 31 with the receivers 18—23, inclusive. We indicate in solid heavy lines the electrical connections between the thermocouples 15, 16 and 17 and the instrumentalities 9 and 10. We indicate pneumatic or air control pressure pipes between the devices 13 and 19 and a selector valve 24 and between the devices 14, 21 and 23 and a selector valve 25 by short dash lines. In like manner by short dash lines we indicate the air pressure connecting pipes between the selector valve 24 and the relay 47 and between the selector valve 25 and the relay 48.

The relation between volume flow rate and differential pressure (head) is:

$$Q = CM\sqrt{2gh} \qquad (A)$$

where
Q=cu. ft. per sec.
C=coefficient of discharge
M=meter constant (depends on pipe diameter and diameter of orifice hole)
$g$=acceleration of gravity=32.17 ft. per sec. per sec.
$h$=differential head in feet of the flowing fluid.

The coefficient of discharge remains substantially constant for any one ratio of orifice diameter to pipe diameter, regardless of the density or specific volume of the fluid being measured. With C, M and $\sqrt{2g}$ all remaining constant, then Q varies as the $\sqrt{h}$. Thus it will be seen that the float rise of the meters 26, 29 and 31 is independent of variations in density or specific volume of the fluid at the three points of measurement and that the reading on the recorder 26 may be of differential head directly indicative of volume flow. If the conduit size and orifice hole size are the same at locations 1 and 2 for example, then the relation of meter readings is indicative of the relation of density and specific volume; head varying directly with specific volume and inversely with density. Thus for the same weight rate of flow past the two metering locations the differential head at location 2 will increase with decrease in density of the fluid, and vice versa.

If it is desired to measure the flowing fluid in units of weight, Formula A becomes:

$$W = CM\sqrt{2ghd} \qquad (B)$$

where
W=rate of flow in pounds per sec.
$d$=density in pounds per cu. ft. of the flow fluid.
$h$=differential head in inches of a standard liquid such as water.
M=meter constant now including a correction between the density $d$ of the flowing fluid being measured and the density of the liquid in the manometer which is some standard such as water.

Assuming the same weight rate of flow passing successively through two similar spaced orifices 27, 30, and with a change in density as may be caused by the heating means A, then the density at the second orifice 30 may be determined as follows:

$$W_{30} = W_{27}$$
$$\sqrt{2gh_{30}d_{30}} = \sqrt{2gh_{27}d_{27}}$$
$$\sqrt{h_{30}d_{30}} = \sqrt{h_{27}d_{27}}$$
$$d_{30} = d_{27} \times \frac{h_{27}}{h_{30}} \qquad (C)$$

Thus it will be observed that, knowing the density of the fluid passing the orifice 27, we may readily determine the density of the fluid passing the orifice 30 from the relation of differential pressures indicated by the meters 26, 29.

Referring to Fig. 2 the recording meters 19, 21 and 23, located on the control panel board 28, are arranged to record the following variables:

(a) Density at inlet to conversion section _____ Meter 19
(b) Density at outlet from conversion section _____ Meter 19
(c) Mean density in conversion section _____ Meter 21
(d) Time in conversion section_____ Meter 21
(e) Yield per pass_____ Meter 23

These variables are determined by means of the following equations:

(a) $$d_2 = d_1 \frac{(cfd^2)_1^2}{(cfd^2)_2^2} \frac{h_1}{h_2} \qquad (1)$$

(b) $$d_3 = d_1 \frac{(cfd^2)_1^2}{(cfd^2)_3^2} \frac{h_1}{h_3} \qquad (2)$$

(c) $$md = \frac{d_2 + d_3}{2} \qquad (3)$$

(d) $$t = \frac{V md}{W} \times 60 \qquad (4)$$

(e) $$Y/P = \frac{.025 S t 10^{\frac{T-850}{60}}}{1 + .025 S \left(\frac{10}{S}\right)^{\frac{2}{7}} t 10^{\frac{T-850}{60}}} \times 100 \qquad (5)$$

Where:

$d_1$ = density at charge (location 1)
$d_2$ = density at inlet to conversion section (location 2)
$d_3$ = density at outlet of conversion section (location 3)
$md$ = mean density in conversion section (between 2 and 3)
$(cfd^2)_1 = cfd^2$ of charge orifice
$(cfd^2)_2 = cfd^2$ of inlet orifice
$(cfd^2)_3 = cfd^2$ of outlet orifice
$h_1$ = head in inches of water across charge orifice
$h_2$ = head in inches of water across inlet orifice
$h_3$ = head in inches of water across outlet orifice
$t$ = time in conversion section
$V$ = volume of conversion section
$W$ = rate of flow through still in pounds per hour
$Y/P$ = yield per pass
$S$ = stock factor
$T$ = mean temperature in conversion section To solve Equations 1 to 5 inclusive, Wheatstone bridges are used. Fig. 4 is a functional diagram of the measuring circuits employed. In each bridge one resistance will be automatically varied by means of a galvanometer amplifying mechanism to maintain the bridge in balance, and it is this resistance which will vary directly proportional to one of the above factors and hence become a measure of that factor. Moved in correspondence with variations in the resistance will be a pen which will indicate and record the value of the factor directly.

In all cases two bridges are maintained in balance by a single amplifying mechanism. For example, referring to Fig. 4, bridge I comprises legs $Rh_1$, $Rh_2$, $$R \frac{(cfd^2)_1^2}{(cfd^2)_2^2} d_1,$$

and $Rd_2$. Bridge II comprises legs $Rh_1$, $Rh_3$, $$R \frac{(cfd^2)_1^2}{(cfd^2)_3^2} d_1$$

and $Rd_3$. With these two bridges a single galvanometer G and amplifying mechanism is used, the galvanometer and amplifying mechanism being periodically switched to be connected with one bridge circuit and then the other.

All of the resistances in any one bridge are not necessarily in a single meter case. The numerals shown on Fig. 4 following each resistance designate the particular meter, as shown in Fig. 2 in which the resistance is located.

The numerical values of the resistances given in the various bridges have been determined by assumption and calculation. The actual values may vary slightly from those given and would be determined from calibration.

*Determination of $d_2$*

From Equation 1:

$$d_2 = d_1 \frac{(cfd^2)_1^2}{(cfd^2)_2^2} \frac{h_1}{h_2} \qquad (1)$$

In bridge I:

$Rh_1$ is proportional to $h_1$
$Rh_2$ is proportional to $h_2$
$R \frac{(cfd^2)_1^2}{(cfd^2)_2^2} d_1$ is proportional to $\frac{(cfd^2)_1^2}{(cfd^2)_2^2} d_1$
$Rd_2$ is proportional to $d_2$.

From the equation for a bridge circuit:

$$\frac{Rh_1}{Rh_2} = \frac{Rd_2}{R \frac{(cfd^2)_1^2}{(cfd^2)_2^2} d_1}$$

or:

$$Rd_2 = R \frac{(cfd^2)_1^2}{(cfd^2)_2^2} \frac{Rh_1}{Rh_2} \qquad (6)$$

$Rd_2$ is therefore a measure of $d_2$. This variable ($d_2$) will be recorded on a uniformly graduated chart in meter 19 having a range of 0 to 40 with the zero at the outside chart graduation.

Figure 7:
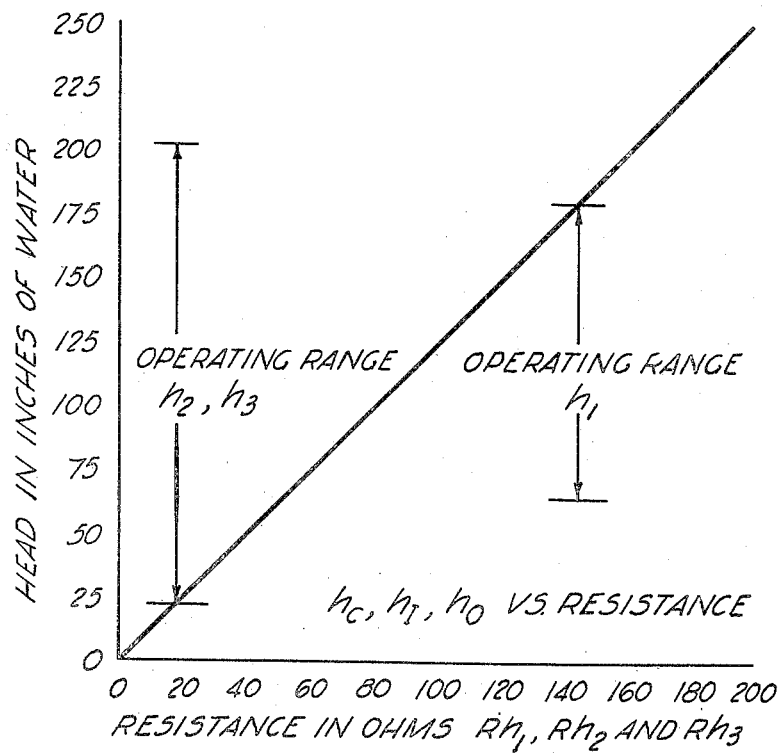
Figure 10:
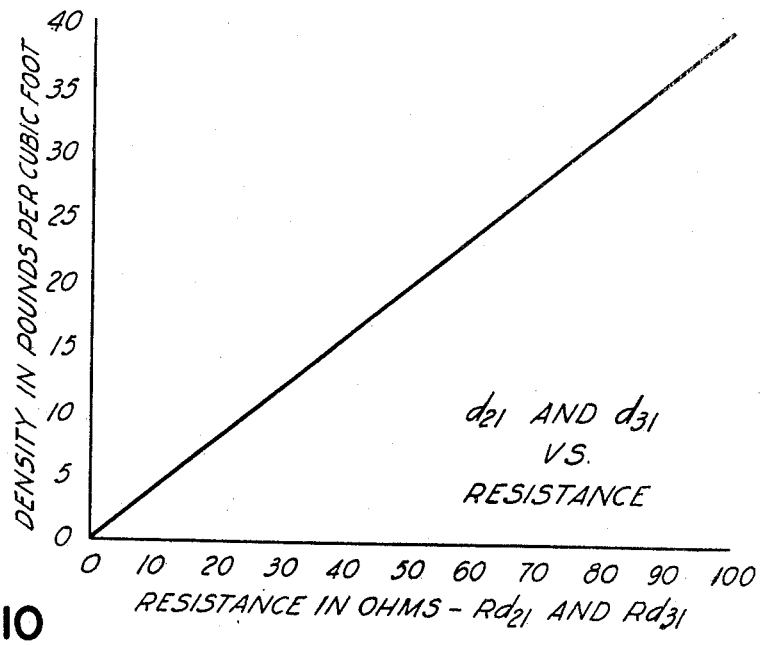
Figure 11:
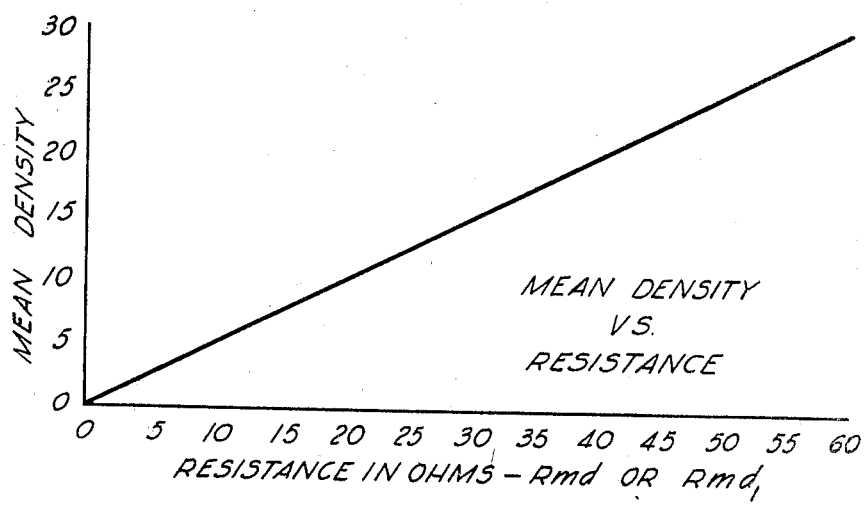
Figure 12:
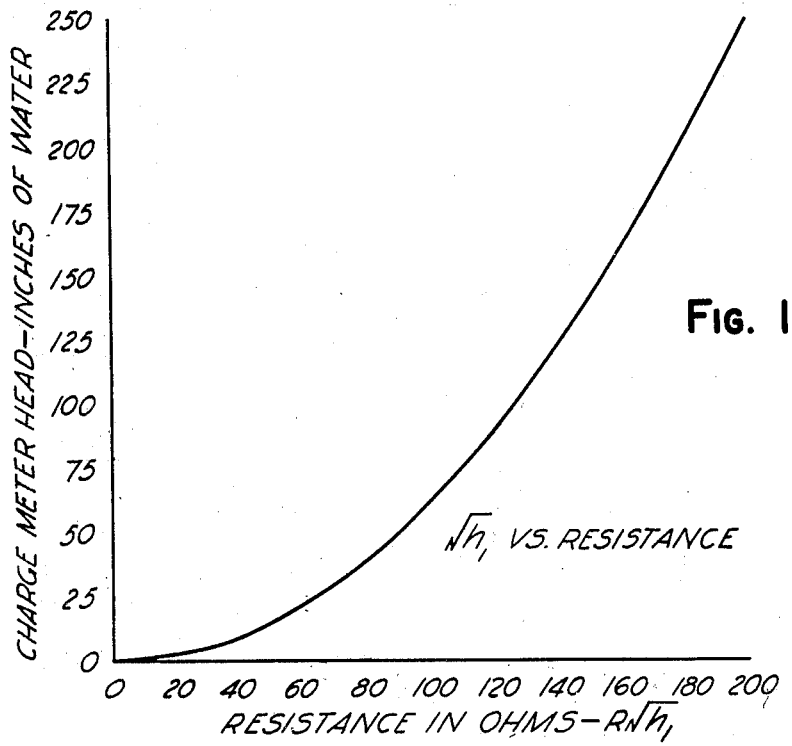
Figure 13:
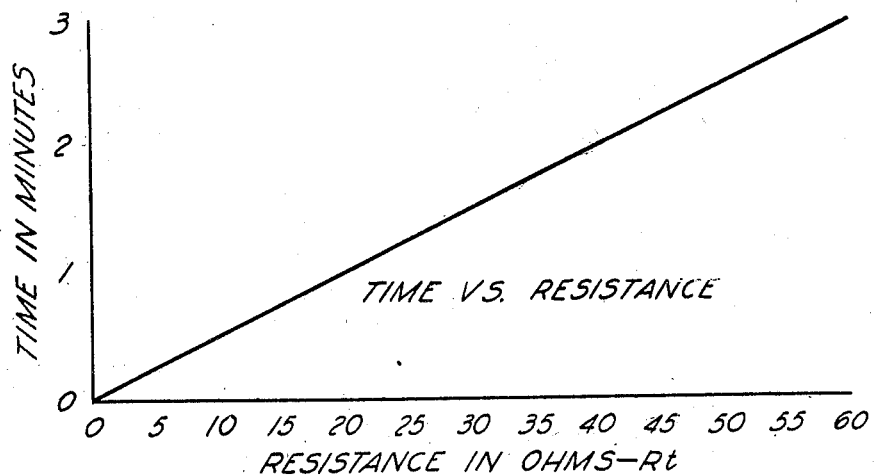

The relation between differential head across charge orifice ($h_1$) and $Rh_1$ is shown on Curve Fig. 7. The charge orifice is fixed, and the differential produced thereby is measured by a 250" max. head meter 26 which varies the $Rh_1$ resistance.

The relation between differential head $h_2$ across the orifice 30 and $Rh_2$ is also shown on Curve Fig. 7. The orifice 30 is adjustable and therefore has a variable $(cfd^2)_2$ depending upon the stem setting. The differential produced by this adjustable orifice is measured by a 250" max. head meter 29 which varies the $Rh_2$ resistance.

The relationship between Density (chart reading) and $Rd_2$ is shown on Curve Fig. 8.

The resistance values for $Rh_1$, $Rh_2$ and $Rd_2$ are arbitrarily chosen. These values determine the values for the $$R \frac{(cfd^2)_1^2}{(cfd^2)_2^2} d_1$$

resistance shown on Curve Fig. 9.

In determining Curve Fig. 9 it was assumed that the minimum $(cfd^2)_2$ ever necessary would be 4.

This resistance $$R \frac{(cfd^2)_1^2}{(cfd^2)_2^2} d_1$$

will be at a maximum $d_1 = 50$, $(cfd^2)_2^2 = 16$.

Under these conditions:

$$d_2 = \frac{10.374 \times 50}{16} \frac{h_1}{h_2} \qquad (7)$$

$$= 32.41 \frac{h_1}{h_2} \qquad (8)$$

but $Rd_2 = \frac{50}{40} d_2$ in ohms $\qquad (9)$

Therefore at $d_1 = 50$; $(cfd^2)_2^2 = 16 \qquad (10)$ $$R \frac{(cfd^2)_1^2}{(cfd^2)_2^2} d_1 = 40.55 \text{ ohms} \qquad (11)$$

It is apparent that the resistances should vary directly with density and as $$\frac{1}{(cfd^2)_2{}^2} \text{ with } (cfd^2)_2$$

On this basis the family of curves shown on Curve Fig. 9 were drawn up. It appears most feasible to have the dials of these resistances graduated in units of resistance. For a given stem setting of orifice 30, the resistance will then be varied in accordance with density. After the $(cfd^2)$ at which orifice 30 will operate has been established the dials may be graduated to read directly in terms of density. Actually a tapered resistance is used to spread out the curves at the higher $(cfd^2)$ readings.

Determination of $d_3$

From Equation 2:

$$d_3 = d_1 \frac{(cfd^2)_1{}^2}{(cfd^2)_3{}^2} \frac{h_1}{h_2} \qquad (2)$$

In bridge II:
  $Rh_1$ is proportional to $h_1$
  $Rh_3$ is proportional to $h_3$ $R\frac{(cfd^2)_1{}^2}{(cfd^2)_3{}^2}d_1$ is proportional to $\frac{(cfd^2)_1{}^2}{(cfd^2)_3{}^2}d_1$ $Rd_3$ is proportional to $d_3$.

The remainder of the derivation is exactly the same as for $d_2$. It will be noted that Curves Figs. 7, 8 and 9 apply equally well.

$d_3$ or density at the outlet of the conversion section (location 3) will be recorded on the same chart 19 with $d_2$.

The outlet orifice 32 is adjustable and therefore has a variable $(cfd^2)_3$ depending upon the stem setting. The differential produced by this orifice is measured by a 250″ max. head meter 31 which varies the resistance $Rh_3$.

Determination of $md$ $md$ is determined by bridge III comprising the resistances $Rd_{21}$, $Rd_{31}$, $Rmd$, A and R. The resistances $Rd_{21}$ and $Rd_{31}$ are varied proportionately to $d_2$ and $d_3$ respectively. Actually, these resistances are mechanically tied to the resistances $Rd_2$ and $Rd_3$ as shown in Figs. 3 and 4, so that they are varied together.

From Equation 3

$$md = \frac{d_2+d_3}{2} \qquad (3)$$

From bridge III $$\frac{Rmd}{Rd_{21}+Rd_{31}} = \frac{A}{R} \qquad (12)$$

$$Rmd = \frac{A}{R}(Rd_{21}+Rd_{31}) \qquad (13)$$

$Rmd$ therefore becomes a measure of $md$ when the proper constants are chosen. The relation between $d_{21}$—$Rd_{21}$ and $d_{31}$—$Rd_{31}$ is shown on Curve Fig. 10. The relation between $md$ and $Rmd$ is shown on Curve Fig. 11. Resistance R is a constant having a value of 150 ohms. These values were arbitrarily chosen. To determine A:

max. mean density=30, $Rmd$=60
  at $md$ of 30, $Rd_{21}+Rd_{31}$=150

$$\frac{60}{150} = \frac{A}{150} \qquad (14)$$

$$A = 60 \text{ ohms} \qquad (15)$$

$md$ will be recorded on a 0–30 uniformly graduated chart 21 having the 0 at the outside edge of the chart.

Determination of $t$ $t$ is determined by bridge IV comprising resistances $Rt$, $$R\frac{V}{\sqrt{d_1}}$$

$R\sqrt{h_1}$ and $Rmd_1$. The resistance $Rmd_1$ is mechanically tied to the resistance $Rmd$ and is accordingly varied in proportion to changes in $md$. The resistance $R\sqrt{h_1}$ is varied proportional to the square root of $h_1$. This resistance is located in meter 26 measuring $h_1$. The resistance $$R\frac{V}{\sqrt{d_1}}$$

is manually adjustable to compensate for changes in $d_1$.

From Equation 4:

$$t = \frac{Vmd}{W} \times 60 \qquad (4)$$

$$= \frac{Vmd}{\sqrt{h_1 d_1}} \times 60 \qquad (16)$$

$$= md \frac{V\frac{1}{\sqrt{d_1}}}{\sqrt{h_1}} \times 60 \qquad (17)$$

From bridge IV:

$$\frac{Rt}{Rmd_1} = \frac{R\frac{V}{\sqrt{d_1}}}{R\sqrt{h_1}} \qquad (18)$$

or $$Rt = Rmd_1 \frac{R\frac{V}{\sqrt{d_1}}}{R\sqrt{h_1}} \qquad (19)$$

$Rt$ therefore becomes a measure of $md$ when the proper constants are chosen. The relation between $\sqrt{h_1}$ and $R\sqrt{h_1}$ is shown on Curve Fig. 12. The relation between $t$ and $Rt$ is shown on Curve Fig. 13. The relation between $md$ and $Rmd_1$ is given by Curve Fig. 11. These resistance values were arbitrarily chosen. Resistance $$R\frac{V}{\sqrt{d_1}}$$

was determined as follows:
  $V$=126 cu. ft. (Example)
  Max. flow=105,000#/hr. at $d_1$=33#/cu. ft. (Example)
  Max. $md$=30#/cu. ft.

Under these conditions:

$$t = \frac{126 \times 30}{105,000} \times 60 = 2.16 \qquad (20)$$

Now substituting resistance values:

$$\frac{43.2}{60} = \frac{X}{200} \qquad (21)$$

where $$X = \text{value of } R\frac{V}{\sqrt{d_1}} \qquad (22)$$

$$X = 144 \text{ ohms} = \text{value of } R\frac{V}{\sqrt{d_1}} \qquad (23)$$

at a $d_1$ of 33 and V of 126.
  At a $d_1$ of 50:

$$X = 144\sqrt{\frac{33}{50}} = 117 \text{ ohms} \qquad (24)$$

and at a $d_1$ of 20:

$$X = 144\sqrt{\frac{33}{20}} = 185 \text{ ohms} \qquad (25)$$

It is apparent that $$R\frac{V}{\sqrt{d_1}}$$

will vary directly with the volume of the conversion section. That is, at a volume of 200 cu. ft.

$$R\frac{V}{\sqrt{d_1}}$$

will have a value (at a $d_1$ of 33#/cu. ft.) of $$144 \times \frac{200}{126} = 228.6 \text{ ohms}$$

Figure 14:
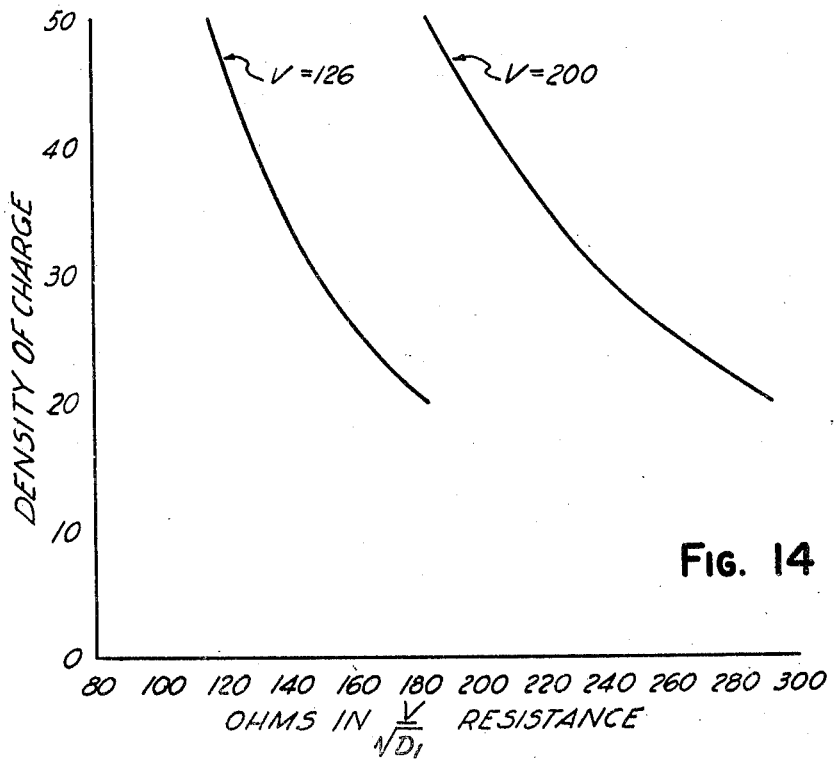
Figure 15:
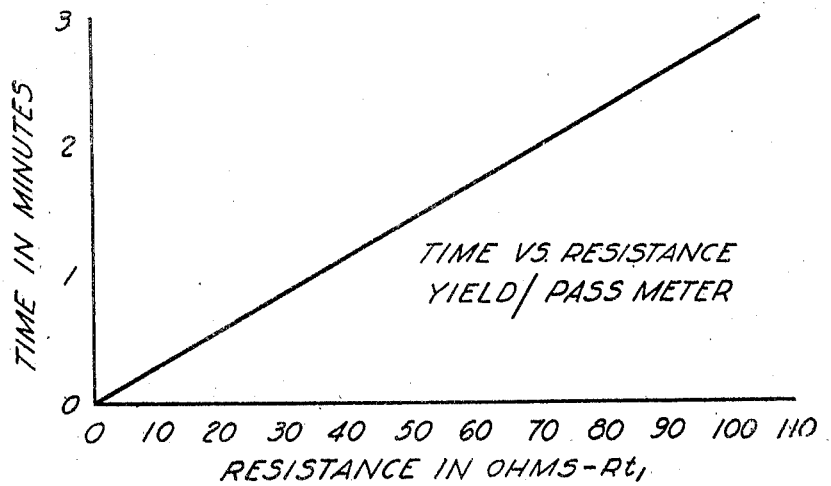

The relation between $d_1$ and $$R\frac{V}{\sqrt{d_1}}$$

is shown on Curve Fig. 14. This resistance is divided into two parts, one part having a fixed value of 117 ohms and the second manually adjustable and having a value of 100 ohms. If it is actually found that the volume of the conversion section is different than that specified then the fixed part of the resistance may be changed so that the total $$R\frac{V}{\sqrt{d_1}}$$

values will fall within the range of adjustability of the variable part of the resistance.

$t$ will be recorded on the same chart 21 with $md$. The range in recorded values being 0–3, the same graduations may be used.

*Determination of Y/P*

From Equation 5

$$Y/P = \frac{.025 S t 10^{\frac{T-850}{60}}}{1 + .025 S \left(\frac{10}{S}\right)^{\frac{2}{7}} t 10^{\frac{T-850}{60}}} \times 100 \quad (5)$$

$$= \frac{.025 S t 10^{\frac{T-850}{60}} \times \frac{1}{\left(\frac{10}{S}\right)^{\frac{2}{7}}}}{\frac{1}{\left(\frac{10}{S}\right)^{\frac{2}{7}}} + .025 S t 10^{\frac{T-850}{60}}} \times 100 \quad (26)$$

Now let:

$$B = .025 S t 10^{\frac{T-850}{60}} \quad (27)$$

$$A = \frac{1}{\left(\frac{10}{S}\right)^{\frac{2}{7}}} \quad (28)$$

Then:

$$Y/P = \frac{AB}{B+A} \quad (29)$$

This however is the equation for the total resistance of an electric circuit having two parallel branches. Accordingly, we may solve the equation to determine $Y/P$ by means of a Wheatstone bridge having one leg in which there are two parallel branches, the resistance of one branch being varied proportional to B and the other proportional to A.

It is first necessary, of course, to determine B. This is done by bridge V comprising the resistances B, $Rt_1$, $$R\frac{1}{S} \text{ and } R 10^{\frac{T-850}{60}}$$

in which:

$Rt_1$ is proportional to $t$ $R\frac{1}{S}$ is proportional to $\frac{1}{S}$ $R 10^{\frac{T-850}{60}}$ is proportional to $10^{\frac{T-850}{60}}$ From the bridge equation:

$$B = \frac{Rt_1 T 10^{\frac{T-850}{60}}}{R\frac{1}{S}} \quad (30)$$

$$= Rt_1 R 10^{\frac{T-850}{60}} RS \quad (31)$$

which agrees with Equation 26 above.

Figure 16:
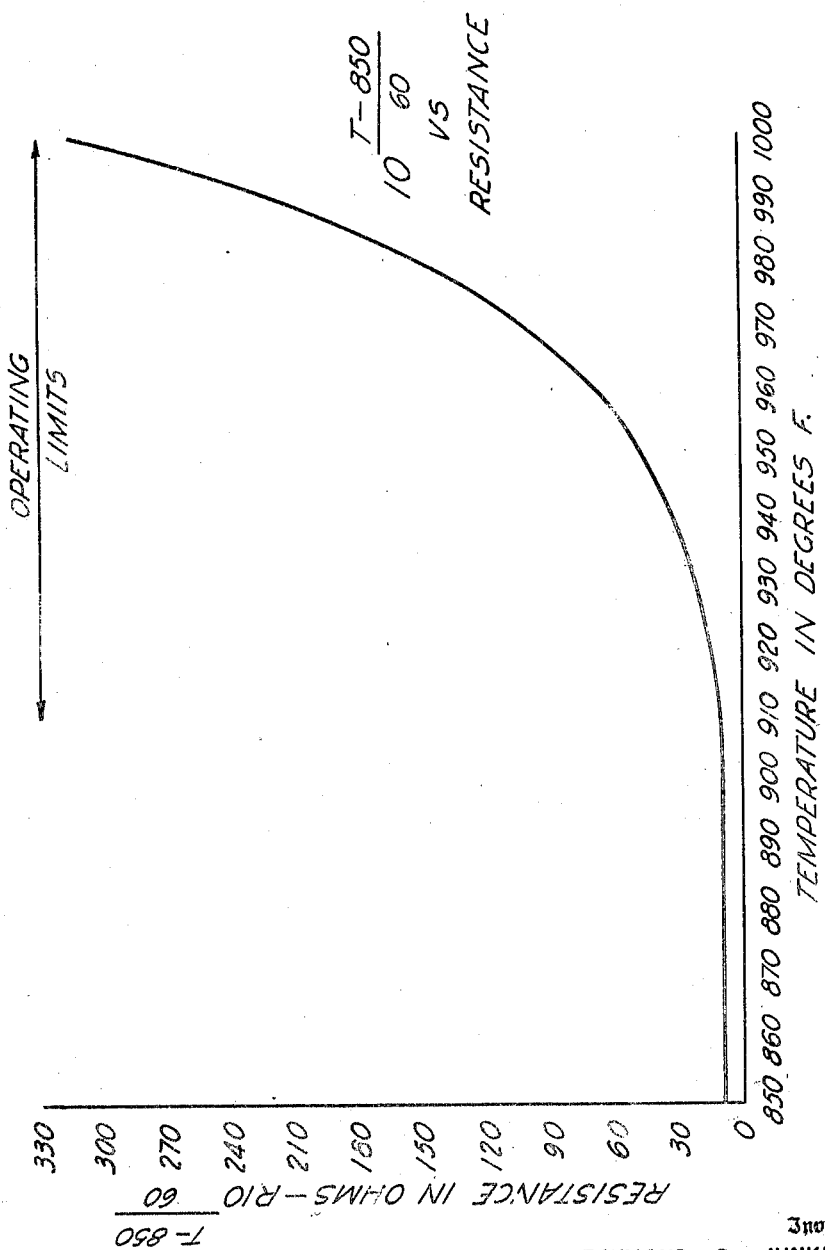

$Rt_1$ is moved with resistance $Rt$. The relation between time and $Rt_1$ is shown in Curve Fig. 15. The resistance $$R 10^{\frac{T-850}{60}}$$

is moved by a galvanometer mechanism 10 measuring the average temperature in the conversion section. This resistance has a logarithmic taper so that actually the resistance varies as $$10^{\frac{T-850}{60}}$$

with respect to temperature. The relation between temperature and $$R 10^{\frac{T-850}{60}}$$

is shown on Curve Fig. 16.

The actual mechanical arrangement between the slide wire resistance of the galvanometer measuring average temperature and the logarithmic taper resistance includes a cam so that any functional relation desired may be obtained between average temperature and resistance.

Figure 17:
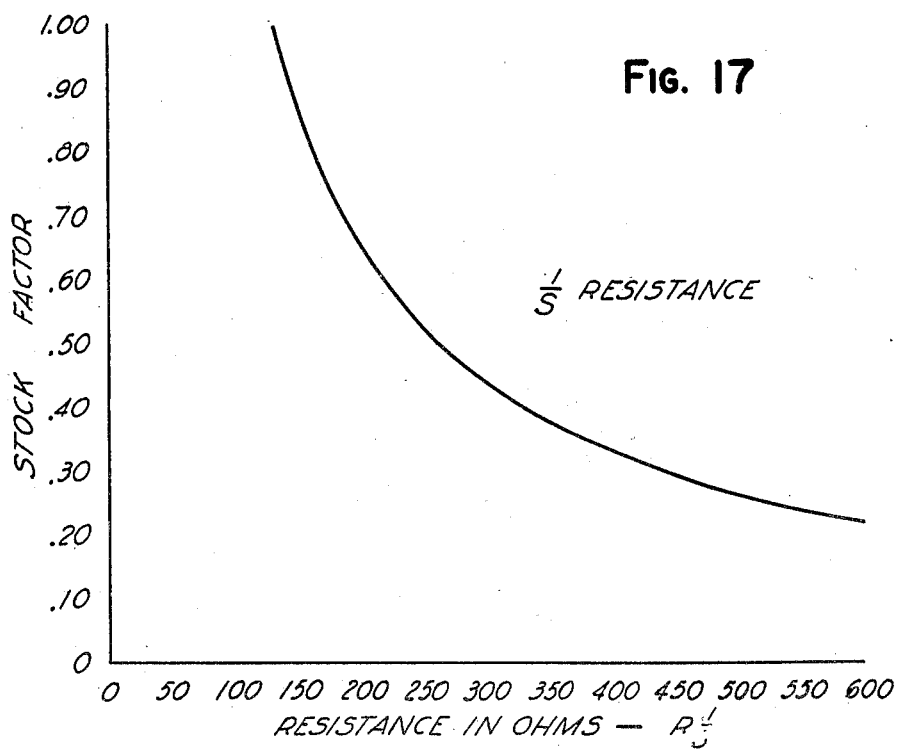
Figure 18:
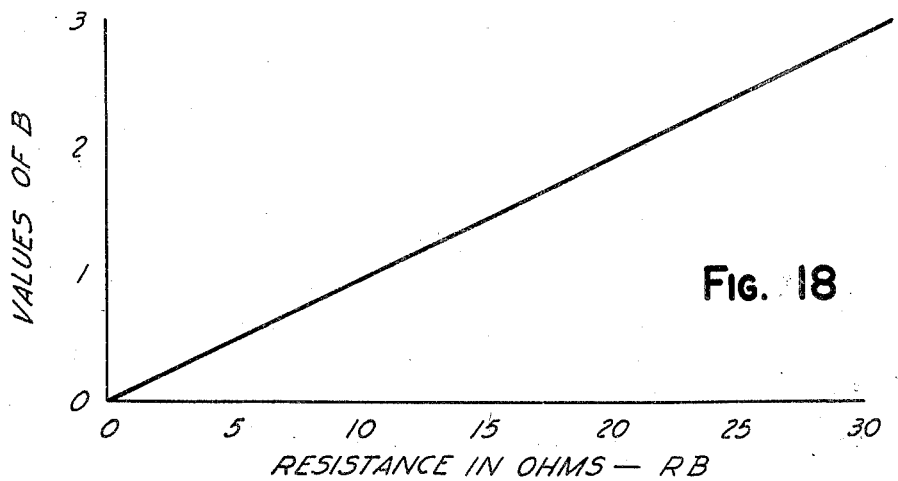

The resistance $$R\frac{1}{S}$$

is manually adjustable and will be graduated in terms of stock factor. The relation between S and $$R\frac{1}{S}$$

is shown on Curve Fig. 17. The resistance dial will be non-uniformly graduated, so that when the dial is moved to different stock factor values, the resistance will actually vary as $$\frac{1}{S}$$

In the present example the max. value B can have within any practical range of operation is 3. At this value, in order for bridge V to be in balance it is necessary that RB have a value of 31.9 ohms. The relation between B and RB is shown by Curve Fig. 18.

Yield per pass is determined by bridge VI comprising the resistances $$R\frac{1}{\left(\frac{10}{S}\right)^{\frac{2}{7}}}$$

and B, in parallel, $$R\frac{Y}{P}$$

E and G. From the bridge equation:

$$\frac{R\frac{Y}{P}}{\frac{R\frac{1}{\left(\frac{10}{S}\right)^{\frac{2}{7}}}RB_1}{R\frac{1}{\left(\frac{10}{S}\right)^{\frac{2}{7}}}+RB_1}} = \frac{E}{G} \quad (32)$$

or:

$$R\frac{Y}{P} = \frac{E}{G}\frac{R\frac{1}{\left(\frac{10}{S}\right)^{\frac{2}{7}}} \times RB_1}{R\frac{1}{\left(\frac{10}{S}\right)^{\frac{2}{7}}}+RB_1} \quad (33)$$

which agrees with Equation 29.

Figure 19:
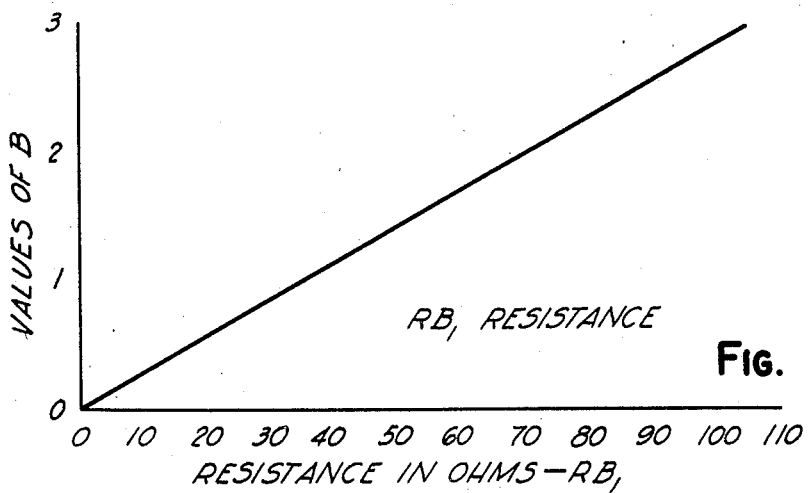
Figure 20:
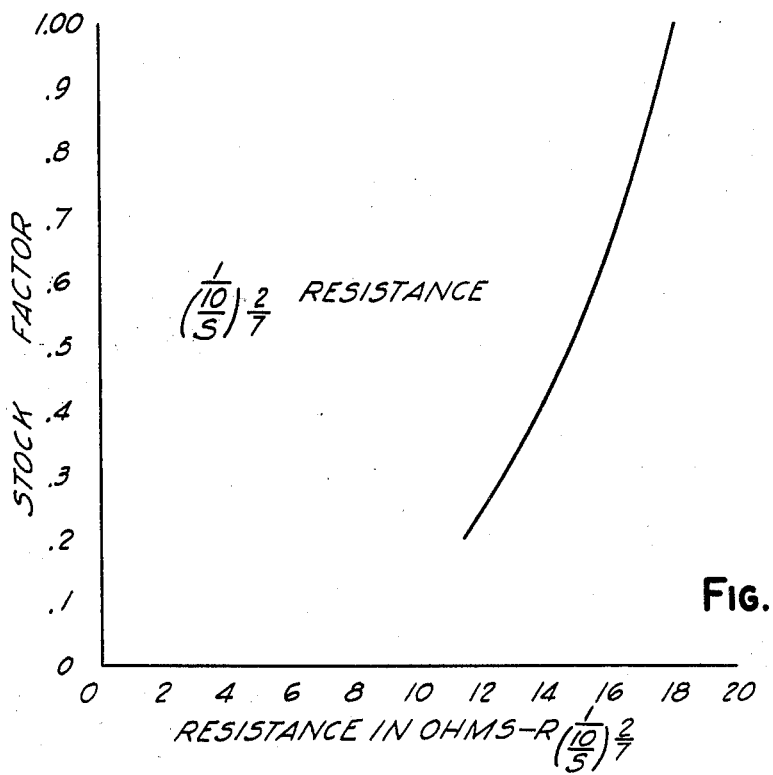

The relation between B and $RB_1$ is shown by Curve Fig. 19. The relation between S and $$R\frac{1}{\left(\frac{10}{S}\right)^{\frac{2}{7}}}$$

is shown by Curve Fig. 20. The relation between $Y/P$ and $R\,Y/P$ is shown by Curve Fig. 22.

Figure 21:
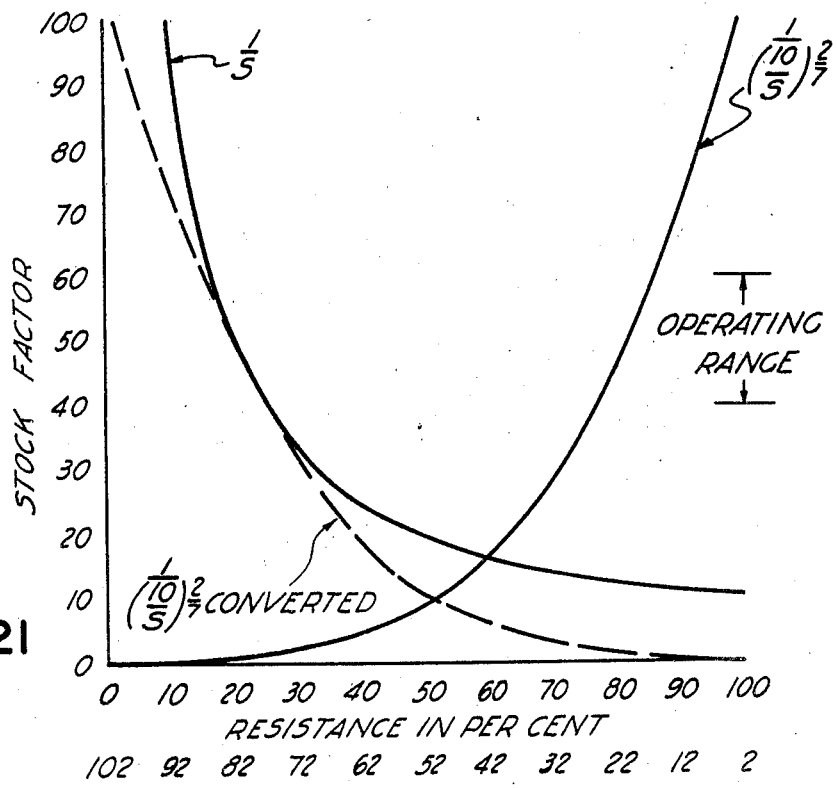
Figure 22:
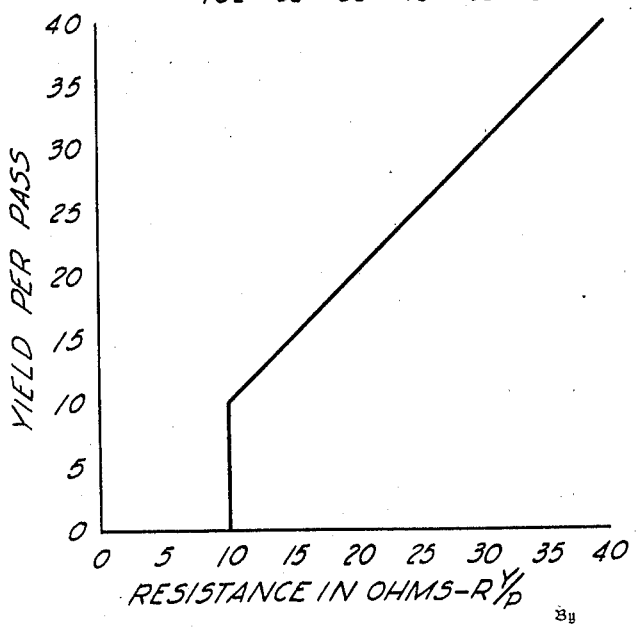

The resistance $$R\frac{1}{\left(\frac{10}{S}\right)^{\frac{2}{7}}}$$

will be mechanically moved with $$R\frac{1}{S}$$

by the same manual adjustment. The shape of the two resistance curves, as shown by Curve Fig. 21 is quite similar, particularly within the range of stock factors expected. Resistance $$R\frac{1}{\left(\frac{10}{S}\right)^{\frac{2}{7}}}$$

will be tapered however, so that when $$R\frac{1}{S}$$

corresponds to $$\frac{1}{S}$$

$$R\frac{1}{\left(\frac{10}{S}\right)^{\frac{2}{7}}}$$

will correspond to $$\frac{1}{\left(\frac{10}{S}\right)^{\frac{2}{7}}}$$

It will be possible to disconnect the resistance $$R\frac{1}{\left(\frac{10}{S}\right)^{\frac{2}{7}}}$$

from the resistance $$R\frac{1}{S}$$

if experiments indicate that the former is a constant within the range of operation. Or by reshaping the resistance practically any relation desired between this resistance and stock factor may be obtained.

TABLES

A

| Temp. | $10^{\frac{T-850}{60}}$ | Per cent of max. value |
|---|---|---|
| 850 | 1.00 | 0.3162 |
| 860 | 1.468 | 0.4641 |
| 870 | 2.154 | 0.681 |
| 880 | 3.162 | 1.000 |
| 890 | 4.642 | 1.468 |
| 900 | 6.813 | 2.154 |
| 910 | 10.000 | 3.162 |
| 920 | 14.68 | 4.641 |
| 930 | 21.54 | 6.810 |
| 940 | 31.63 | 10.00 |
| 950 | 46.42 | 14.68 |
| 960 | 68.13 | 21.54 |
| 970 | 100.00 | 31.62 |
| 980 | 146.8 | 46.41 |
| 990 | 215.4 | 68.10 |
| 1,000 | 316.3 | 100.00 |

B

| S | $\frac{10}{S}$ | $\frac{1}{\left(\frac{10}{S}\right)^{\frac{2}{7}}}$ | Per cent of max. value |
|---|---|---|---|
| 1. | 10.000 | .5179 | 100 |
| .9 | 11.11 | .5025 | 96.95 |
| .8 | 12.50 | .4859 | 93.82 |
| .7 | 14.26 | .4677 | 90.31 |
| .6 | 16.67 | .4476 | 86.41 |
| .5 | 20.00 | .4248 | 81.97 |
| .4 | 25.00 | .3987 | 76.98 |
| .3 | 33.33 | .3672 | 70.90 |
| .2 | 50.00 | .3270 | 63.18 |
| .1 | 100.00 | .2682 | 51.79 |

In Fig. 3 we illustrate by dash rectangles the recorder-controllers 18, 19, 20, 21, 22 and 23 located on the panel board 28 of Fig. 2. It will be observed that items 19, 21 and 23 are recorders, whereas items 18, 20 and 22 contain measuring and controlling circuits and apparatus.

Fig. 4 is a functional or diagrammatic layout of the Wheatstone bridge circuits previously mentioned and which have their component parts located in the various numbered items of Fig. 2. The various resistances, etc. of Fig. 4 are clearly numbered with the numbers of the meters or controllers of Fig. 2 in which they are respectively located.

In Fig. 4 the dash lines indicate mechanical connections. For example, meter 26 at location 1 adjacent the orifice 27 is positioned responsive to differential head across said orifice and records at that location the rate of flow (charge) entering the heated flow path as desired in terms of volume rate of flow or weight rate of flow. In Fig. 4 meter 26 is indicated as representative of $h_1$ and $h_1$, the latter through the agency of a cam. The necessary mechanical connections (represented by dash lines), and within the meter casing 26, mechanically move the adjustable resistance $Rh_1$, and through the agency of the cam mechanically positions the arm of the adjustable resistance $Rh_1$.

In similar fashion, referring to Fig. 4, transmitter 29 mechanically positions the adjustable arm of resistance $Rh_2$ located therein, and the transmitter 31 mechanically positions the adjustable arm of resistance $Rh_3$ located at said transmitter 31.

In Fig. 4 further mechanical connections between the bridge elements are illustrated by short dash lines. Thus the arm of resistance $Rd_2$ is mechanically moved with the arm of resistance $Rd_{21}$, both resistances being located in item 19.

In Fig. 4 electrical connections between the instruments on the panel board 28 and the transmitters are shown by dot dash lines. These correspond to the long dash lines on Fig. 2. In the latter the electrical connections, however, are shown as a single long dash line representing a cable of one or more conductors. Thus it will be observed that while the Wheatstone bridges are shown completely mechanically and electrically interconnected in Fig. 4, the various components thereof are scattered according to Fig. 2. For example, certain resistance legs of the bridges are physically located in and moved by the transmitting meters 26, 29 and 31. Furthermore, in Fig. 4 we illustrate the circuit connections for the thermocouples shown at locations 1, 2 and 3 and the way in which they are interconnected and interrelated with the temperature recorders 9, 10 and the controllers 13, 14, as well as the Wheatstone bridges V and VI. Fig. 3 is of the same apparatus and circuits illustrated in Fig. 4, but so arranged as to show which parts of the various Wheatstone bridge circuits and apparatus are included in the individual items 18, 19, 20, 21, 22 and 23 of Fig. 2. Furthermore, Fig. 3 clearly shows the galvanometer rebalancing circuits and mechanism which are not shown at all in Fig. 4. For more detailed understanding of the galvanometer rebalancing system reference may be had to the patent to Ryder 1,931,474. In general, when a Wheatstone bridge is thrown out of balance the galvanometer contactor controls a reversing motor in one direction or the other to move a resistance leg of the bridge for rebalancing same. The position of the adjustable arm so moved on the rebalancing resistance leg is an indication of the value of the condition to which the bridge is sensitive.

Reference to Fig. 3 will, therefore, clearly show the manner in which, for example, the galvanometer in item 18 actuates the reversing motors in item 19 to rebalance bridges I and II. The position of the arm moved by the one motor in item 19 is transmitted to a recording pen for recording in item 19 continuously the value of density at location 2, namely, $d_2$. Likewise the second reversible motor in item 19, also under the control of the galvanometer of item 18, results in a record of density at location 3, namely, $d_3$. In like manner the recorder 21 continuously records time of detention and mean density, whereas the recorder 23 continuously records yield per pass.

The various resistance arms which are mechanically interconnected and moved simultaneously by the control motors are clearly illustrated in both Figs. 3 and 4. Likewise in both figures the various resistance legs of the Wheatstone bridges have been designated with the same resistance designations as carried out in the various equations above.

Referring to Fig. 3, it will be observed that an air pilot valve 51 is under the control, or positioned with, the elements representative of $d_2$. Likewise in item 21 an air pilot valve 54 is positioned representative of $md$. In item 23 an air pilot valve 57 is positioned representative of $Y/P$. The temperature controllers 13 and 14 each have an air pilot valve positioned representative of a temperature.

Such pilot valves are fully disclosed and claimed in the patent to Johnson No. 2,054,464, and suffice it to say here are of a type wherein a gradation of control pressure is produced by axial movement of the pilot stem in its casing. The relationship between pilot stem movement and control pressure may be a lineal or straight line relation or may be curved in functional relation as desired. For the present invention it is assumed that probably a lineal or straight line relation is all that will be necessary.

In Figs. 3 and 4 various terminal points for the electrical connections have been given numerals to aid in following through the electrical circuits.

In Fig. 2 the dash lines 45 and 46 interconnect the temperature controllers 13, 14 with the selector valves 24, 25 respectively. Positioned in the pipe 45 is a shutoff valve 49, while in the pipe 46 is a shutoff valve 50.

The pilot valve 51 located in item 19 is connected to the selector valve 24 through a pipe 52 having a shutoff valve therein 53. The pilot valve 54 in item 21 is connected to the selector valve 25 by a pipe 55, having therein a shutoff valve 56. The pilot valve 57 located in item 23 is connected to selector valve 25 through a pipe 58 having therein a shutoff valve 59.

It will thus be apparent that we have available at the selector valve 24 an air loading pressure through the pipe 45 from the temperature controller 13 representative of $t_2$ at location 2. That we also have there available a loading pressure through the pipe 52 representative of $d_2$. Thus through the agency of shutoff valves 49, 53 we may select, if we have available at the selector valve 24, a control pressure either representative of $t_2$ or $d_2$. Reference to Fig. 2 will show that the selector valve 24 is connected through a pipe 60 with the relay 47.

We have available at the selector valve 25 an air loading pressure through the pipe 55 representative of $md$, through the pipe 46 representative of $t_3$, and through the pipe 58 representative of $Y/P$. Through the agency of shutoff valves 56, 50 and 59 we may selectively apply one of the three air loading pressures to the selector valve 25, which in turn is connected through the pipe 61 with the relay 48.

Fig. 6 illustrates the panel board face of the selector valve 24 or 25, and which will be described more in detail in connection with Fig. 5.

Referring now to Fig. 5, we show the piping interconnections, for example between the controller 13, the selector valve 24, the relay 47, and the fuel control valve 34. A particular feature of Fig. 5 is the diagrammatic showing of the construction and operation of the selector valve 24. It is to be understood that the showing and description in connection with Fig. 5 all apply particularly to the air control system for the burners A and the air supplied thereto and is equally well adapted to the control of the fuel supply valve to the burners B and its air supply.

The meter 36 is adapted to give a record of the rate of supply of fuel through the conduit 33 supplied to the burners A by being responsive to the differential pressure existing across the orifice 35 located in the conduit 33. The mechanism of the meter 36 is also adapted to position an air pilot valve similar to those previously described for establishing an air loading pressure varying directly with rate of fuel flow through the conduit 33. This loading pressure is applied through a pipe 62 to an indicating meter 63 located on the panel board of Fig. 2 for giving a continuous remote indication of rate of fuel supply. A similar scale of the indicator 63 gives a continuous indication of the rate of fuel supply to the burners B, while two additional scales on the meter 63 give continuous indications of rate of charge to the fluid circuit.

The air control pressure pipe 62 is connected to one chamber of a relay mechanism 64, and is also directly connected through the pipe 37 with the pneumatic actuator 6 for the damper 5. A shutoff valve 38 in the pipe 37 allows the control of the actuator 6 to be taken away from the meter 36 and allows the damper 5 to be positioned by hand or locked in a given position as may be desired.

The relayed or amplified air pressure produced by the relay 64 is transmitted through a pipe 65 to a valve 5 of the relay 24. From the valve 5 a pipe 66 leads to a chamber of the standardizing relay 67. A second chamber of the relay 67 is joined by the pipe 45, carrying an air loading pressure established by the controller 13 or an air loading pressure through the pipe 52 established by the pilot 51 representative of density at location 2, namely, $d_2$. The pipes 45, 52 are controlled respectively by the shutoff valves 49, 53, so that selectively one or the other may be effective within the relay 67.

Control pressure established by the relay 67 is effective through a pipe 68 within a chamber of the relay 47, while another chamber of the relay 47 is joined by a pipe 60 coming from the valve 4 of the selector valve 24. This pressure, controlled by the valve 4, is originated by the hand loaded relay C from which the pipe 70 also joins the valve 2. From the valve 3 a pipe 71 joins the actuating diaphragm of the valve 34 for positioning the same.

The relay mechanisms 64, 67 and 47 are more fully illustrated, described and claimed in the patent to Dickey 2,098,913 and the patent to Gorrie 2,098,914, to which reference may be had for a more detailed explanation thereof.

In Fig. 5 we give a tabulation of sequence of operation of the selector valve 24, both as to the hand movable knobs B and C. When manual adjustment of the valve 34 is desired, then the knob B is turned to the "Manual" position and the knob C is turned in one direction or the other to load or vary the value of the control pressure effective through the pipe 71 for positioning the valve 34.

Certain features of the selector valve 24 are disclosed and claimed in the copending application of Edward W. Fitch, Serial No. 146,697, filed June 5, 1937, although additional features of the present selector valve, patentable over the invention of said Fitch, are disclosed and claimed by us herein.

In general, the arrangement of Fig. 5 provides a constant flow control for the fuel to the burners A, i. e. a control of the valve 34 to maintain a preestablished rate of flow of fuel through the conduit 33. We provide on the meter 36 a continuous record of the existing rate of flow of fuel supplied to the burners A. We provide at the meter 63 remotely from the orifice 35 a telemetered indication continuously of the existing rate of supply of fuel to the burners A. The arrangement is such that the damper 5 and thereby control of air for combustion of said fuel is controlled in accordance with the metered fuel supply, and thus a fuel-air ratio control is had.

In the particular embodiment being described it is highly advantageous to control the supply of fuel to the burners A not only in accordance with a constant flow control, but also selectively in accordance with a variable condition of the fluid being treated or processed in the portion 11 of the fluid flow path. Such variables in the present embodiment, and as indicated in Fig. 5, are temperature at location 2, or density of the fluid at location 2; the former effective through the controller 13 and the latter through the controller 19. Selectively one or the other of these variables may be superimposed upon the constant flow control for varying the standard thereof, and thus having its effect upon the positioning of the valve 34. In the present embodiment, control of the air for combustion is directly by fuel-air ratio and is not effected by the modifying or standard-setting control $t_2$ or $d_2$.

In general, control of the rate of fuel supply, through positioning of the valve 34, is accomplished selectively (1) manually, (2) by a constant flow control, (3) by a constant flow control whose standard is reset in accordance with density $d_2$, and (4) by a constant flow control whose standard is reset by temperature $t_2$. In general it will be observed that the standard of the constant flow control is reset in accordance with the value of a variable condition of the processing or treating effected by the application of the fuel under control.

In similar manner the burners B are controlled selectively in accordance with mean density $md$ or temperature at location 3, namely, $t_3$, or yield per pass through the conversion section 12, or by hand.

It is readily apparent that the resetting of the constant fuel flow control in either instance might be from any variable condition representative of the effect of the treatment. Furthermore, that by very simple rearrangement of the piping of Fig. 5 the primary control of the valve 34 might be selectively from $d_2$ or $t_2$ with the resetting of said control accomplished through the agency of the meter 36.

It is our contemplation in the control of a forced flow stream of fluid undergoing treatment or processing, such as has been illustrated and described, the treatment or change in condition or characteristic of the fluid at various points in its flow path may be effected not only by heating but also through variation in the rate of flow of the fluid, namely, in the rate to which the meter 26 is responsive. Referring to Fig. 2 for example, we show a spring-loaded diaphragm-actuated control valve 100 located in the charge line ahead of the orifice 27 for regulating the weight rate of fluid flow through the path. Air pressure, effective upon the diaphragm valve 100 for positioning the same, is transmitted thereto through a pipe 101 connected by the valve 102 with the pipe 52 and by a valve 103 with the pipe 55. Thus the valve 100 may be selectively under the control of a density condition of the fluid at location 2 or at location 3. It is, of course, appreciated that the same weight rate of flow exists throughout the path, but through change in density or specific volume the volume rate of flow may vary from location to location. While we have particularly illustrated and described the treatment of the flowing fluid (in the preferred embodiment being hydrocarbon oils) as accomplished by the application of heat to one or more portions of the path, we contemplate that a variation in the rate of flow of charge may be desirable to produce optimum results and to maintain certain of the variables, such as density at a given location in the flow path, at predetermined value. Furthermore, back pressure at the exit of the path may desirably be controlled as effective upon the density conditions, the time of detention, the yield per pass, or other variable characteristics being discussed herein. Thus while we have particularly illustrated and described the invention in connection with the control of heating to a plurality of portions of the forced flow path, we contemplate that similar control may desirably be applied to the rate of charge and/or to back pressure at the exit of the path.

Furthermore, while we have indicated that burners A are selectively under the control of $t_2$ or $d_2$ we might desirably arrange to have burners A selectively under the control of one or more of the variables which have been (in the present embodiment) utilized in the control of burners B. Conversely, those variables which have been described in connection with control of burners A might be used for the control of burners B. In general, the control of burners A and/or B may be under the control of one or more variable characteristics or conditions of the flowing fluid undergoing treatment.

The present invention and arrangement of control is particularly advantageous in connection with divided furnace operation, or separate furnace operation, in either of which we mean that the fluid flow path undergoing treatment is divided into at least two portions and the separate portions are susceptible to heating or treatment and separately controllable. Preferably the separately treated portions of the forced flow path are controlled in accordance with variable conditions of the fluid in that portion of the path, or representative of the treatment which has been accomplished in that portion of the path.

While we have particularly illustrated and described the present invention as relating to a cracking still for the treatment of petroleum hydrocarbons, it is to be definitely understood that we are not to be limited thereto, but that the invention may equally as well be adapted to the treatment of any flowing fluid stream in a confined path as, for example, in the generation of steam from water or in chemical processes, etc.

What we claim as new, and desire to secure by Letters Patent of the United States, is:

1. Apparatus for controlling the treatment of a selected fluid flowing under pressure through a confined flow path and having a portion of the path heated by a first set of burners and another portion of the path heated by a second set of burners, comprising in combination therewith, means responsive to temperature of the fluid at the outlet of said first heated portion and adapted to control the first set of burners, and means responsive to a density condition of the fluid at the outlet of said second heated portion and adapted to control the second set of burners.

2. Apparatus for controlling the treatment of a selected fluid flowing under pressure through a confined flow path and having a portion of the path heated by a first set of burners and another portion of the path heated by a second set of burners, comprising in combination therewith, means responsive to temperature of the fluid at the outlet of said first heated portion and adapted to control the treatment of the fluid in said portion of the path, and means responsive to a density condition of the fluid at the outlet of said second heated portion and adapted to control the treatment of the fluid in said second portion of the path.

3. Apparatus for controlling the treatment of a selected fluid flowing under pressure through a confined flow path and having a first portion of the path heated by the elements of combustion through one source of supply and a second portion of the path heated by the elements of combustion through another source of supply, comprising in combination therewith, means responsive to temperature of the fluid at the outlet of said first heated portion and adapted to control the supply of the elements of combustion for the heating thereof, and means responsive to a density condition of the fluid at the outlet of said second heated portion and adapted to control the second supply of the elements of combustion for heating said second portion of the path.

4. Apparatus for controlling the treatment of a selected fluid flowing under pressure through a confined flow path and having a first portion of the path heated by one set of burners and a second portion of the path heated by a second set of burners, comprising in combination therewith, means responsive to density of the fluid at the exit of said portion of the path and adapted to regulate the treatment of said first portion, and means responsive to density of the fluid at the exit of said second portion of the path and adapted to regulate the treatment of said second portion.

5. Apparatus for controlling the treatment of a selected fluid flowing under pressure through a confined flow path and having a first portion of the path heated by one set of burners and a second portion of the path heated by a second set of burners, comprising in combination therewith, means responsive to in situ density of the fluid leaving said first portion of the path and adapted to regulate the treatment of said portion, and means responsive to mean density of the fluid in the second portion of the path and adapted to regulate the treatment of said second portion.

6. Apparatus for controlling the treatment of a selected fluid flowing under pressure through a confined flow path and having a first portion of the path heated by one set of burners and a second portion of the path heated by a second set of burners, comprising in combination therewith, means responsive to an indication of density condition of the fluid in one portion of the path subject to treatment and adapted to vary such treatment, and means responsive to an indication of density condition of the fluid in another portion of the path subject to treatment and adapted to vary such treatment.

7. Apparatus for controlling the treatment of a selected fluid flowing under pressure through a confined flow path and having a first portion of the path heated by one set of burners and a second portion of the path heated by a second set of burners, comprising in combination therewith, means responsive to in situ density of the fluid leaving one of the portions for controlling the treatment of that portion, and means responsive to the yield per pass of another portion adapted to control the treatment of said last portion.

8. Apparatus for controlling the treatment of a selected fluid flowing under pressure through a confined flow path and having a first portion of the path heated by one set of burners and a second portion of the path heated by a second set of burners, comprising in combination therewith, a constant flow control on the fuel supply to the first set of burners, means responsive to density of the fluid at the outlet of the first heated portion of the path resetting the control standard of said constant flow control, a constant flow control on the fuel supply to the second set of burners, and means responsive to a density condition of the fluid in the second portion of the path resetting the control standard of the second constant flow control.

9. Apparatus for controlling the treatment of a selected fluid flowing under pressure through a confined flow path and having a first portion of the path heated by one set of burners and a second portion of the path heated by a second set of burners, comprising in combination therewith, a constant flow control on the fuel supply to the first set of burners, means responsive to density of the fluid at the outlet of the first heated portion of the path resetting the control standard of the said constant flow control, a constant flow control on the fuel supply to the second set of burners, and means responsive to a yield per pass determination of the fluid in the second portion of the path resetting the control standard of the second constant flow control.

10. Apparatus for controlling the treatment of a selected fluid flowing under pressure through a confined flow path, comprising in combination, fuel supply means for heating the path, a constant flow control for said means, and means responsive to a density condition of the fluid undergoing treatment adapted to establish the control standard of the constant flow control.

11. Apparatus for controlling the treatment of a selected fluid flowing under pressure through a confined flow path and having a portion of the path heated by a first set of burners and another portion of the path heated by a second set of burners, comprising in combination therewith, means responsive to temperature of the fluid at the outlet of said first heated portion and adapted to control the first set of burners, means responsive to a density condition of the fluid at the outlet of said second heated portion and adapted to control the second set of burners, and means responsive to a density condition of the fluid and adapted to control the weight rate of flow of the fluid through the path.

12. Apparatus for controlling the treatment of a selected fluid flowing under pressure through a confined flow path and having a first portion of the path heated by a first heating means and a second subsequent portion of the path heated by a second heating means, comprising in combination therewith, means responsive to a variable condition or quality of the fluid leaving the first portion of the path controlling the first heating means, means responsive to a variable condition or quality of the fluid leaving the second portion of the path controlling the second heating means, and means responsive to a density condition of the fluid subsequent to the initiation of treatment adapted to control the weight rate of flow of the fluid through the path.

13. Apparaus for controlling the treatment of a selected fluid flowing under pressure through a confined flow path and having a first portion of the path heated by a first heating means and a second subsequent portion of the path heated by a second heating means, comprising in combination therewith, means responsive to a variable condition or quality of the fluid leaving the first portion of the path controlling the first heating means, and means responsive to a density condition of the fluid subsequent to the initiation of treatment adapted to regulate both the second heating means and the weight rate of flow of fluid through the path.

14. Apparatus for controlling the treatment of a selected fluid flowing under pressure through a confined flow path and having a first portion of the path heated by a first heating means and a second subsequent portion of the path heated by a second heating means, comprising in combination therewith, means responsive to a variable condition or quality of the fluid leaving the first portion of the path controlling the first heating means, means continuously establishing a manifestation of in situ density of the fluid subsequent to the initiation of treatment, and means selectively controlling either the second heating means or the weight rate of fluid flow through the path responsive to said density means.

RAYMOND D. JUNKINS.
JOHN F. LUHRS.
JOHN D. RYDER.